US012211032B2

(12) United States Patent
Shamai et al.

(10) Patent No.: US 12,211,032 B2
(45) Date of Patent: Jan. 28, 2025

(54) TRANSFERRING DIGITAL ASSETS POSSESSION OVER A UNIDIRECTIONAL CONNECTION

(71) Applicant: Galaxy Digital Trading LLC, New York, NY (US)

(72) Inventors: Shahar Shamai, Rehovot (IL); Lior Lamesh, Rishon-LeZion (IL)

(73) Assignee: Galaxy Digital Trading LLC, New York, NY (US)

( * ) Notice: Subject to any disclaimer, the term of this patent is extended or adjusted under 35 U.S.C. 154(b) by 410 days.

(21) Appl. No.: 16/404,843

(22) Filed: May 7, 2019

(65) Prior Publication Data

US 2020/0356989 A1 Nov. 12, 2020

(51) Int. Cl.
G06Q 20/36 (2012.01)
G06Q 20/38 (2012.01)
H04L 9/08 (2006.01)

(52) U.S. Cl.
CPC ..... *G06Q 20/3678* (2013.01); *G06Q 20/3674* (2013.01); *G06Q 20/3829* (2013.01); *H04L 9/0825* (2013.01); *H04L 9/0869* (2013.01)

(58) Field of Classification Search
CPC ............ G06Q 20/065; G06Q 20/3829; G06Q 20/3674; G06Q 20/3678; H04L 9/0869; H04L 9/0825
See application file for complete search history.

(56) References Cited

U.S. PATENT DOCUMENTS 9,892,460 B1 * 2/2018 Winklevoss ........... G06Q 40/04
2014/0282938 A1 * 9/2014 Moisa ................. G06F 16/1827
726/6
2015/0324789 A1 11/2015 Dvorak
(Continued)

FOREIGN PATENT DOCUMENTS

AU 2018203904 A1 * 12/2019
CA 3041159 4/2019
(Continued)

OTHER PUBLICATIONS

The Cold Wallet 2.0—ELLIPAL Launches Mobile-oriented Cold Wallet for Cryptocurrency; M2 Presswire, 2018, Coventry: Normans Media Ltd.*
(Continued)

*Primary Examiner* — Ilse I Immanuel

(57) ABSTRACT

A method of increasing security of digital assets stored in an isolated device by associating the isolated device with a plurality of accounts of the user each configured to store a limited value of digital assets, each of the plurality of accounts is assigned an asymmetric cryptographic key pair (comprising a unique private key encrypting the respective account and a corresponding public key identifying the respective account), transmitting, via a unidirectional secure channel, the public key assigned to each of the plurality of accounts to one or more computing nodes connected to a network community regulating the digital assets and transferring a value of the digital assets by transmitting, to one or more of the computing nodes, the private key of one or more of the plurality of accounts cumulatively storing the transferred value thus releasing the limited value stored in the respective account(s).

29 Claims, 13 Drawing Sheets

(56) References Cited

U.S. PATENT DOCUMENTS

| | | |
|---|---|---|
| 2017/0317997 A1 | 11/2017 | Smith et al. |
| 2019/0052454 A1 | 2/2019 | Wright et al. |
| 2021/0049591 A1* | 2/2021 | Lamesh ................ G06F 21/725 |
| 2021/0083872 A1* | 3/2021 | Desmarais ......... G06Q 20/3829 |
| 2021/0312437 A1 | 10/2021 | Torii |

FOREIGN PATENT DOCUMENTS

| | | |
|---|---|---|
| EP | 3259724 | 12/2017 |
| EP | 3457343 | 3/2019 |
| JP | 6-445211 | 12/2018 |
| WO | WO 2018/020389 | 2/2018 |
| WO | WO 2019/159172 | 8/2019 |
| WO | WO 2020/225814 | 11/2020 |

OTHER PUBLICATIONS

International Preliminary Report on Patentability Dated Nov. 18, 2021 From the International Bureau of WIPO Re. Application No. PCT/IL2020/050496. (06 Pages).

International Search Report and the Written Opinion Dated Jun. 3, 2020 From the International Searching Authority Re. Application No. PCT/IL2020/050496. (29 Pages).

Search Report and Written Opinion Dated May 3, 2023 From the Intellectual Property Office of Singapore, IPOS Re. Application No. 11202112273U. (9 Pages).

Supplementary European Search Report and the European Search Opinion Dated Jan. 3, 2023 From the European Patent Office Re. Application No. 20802429.9. (11 Pages).

Fargo "Hardbit Bitcoin Wallet—An Offline ans Secure Storage Unit", Retrieved from the Internet, May 20, 2014, 8 pages.

* cited by examiner

TRANSFERRING DIGITAL ASSETS POSSESSION OVER A UNIDIRECTIONAL CONNECTION

RELATED APPLICATIONS

This application is related to U.S. Provisional Patent Application No. 62/775,942 titled "SECURE CONSENSUS OVER A LIMITED CONNECTION", filed on Dec. 6, 2018, the contents of which are all incorporated by reference as if fully set forth herein in their entirety.

This application is also related to PCT Patent Application No. PCT/IL2019/050181 titled "CRYPTOCURRENCY WALLET AND CRYPTOCURRENCY ACCOUNT MANAGEMENT", filed on Feb. 14, 2019, the contents of which are all incorporated by reference as if fully set forth herein in their entirety.

FIELD AND BACKGROUND OF THE INVENTION

The present invention, in some embodiments thereof, relates to improving security of digital assets stored in a limited connection isolated device, and, more specifically, but not exclusively, to improving security of digital assets stored in a limited connection isolated device using a plurality of limited value accounts.

In the modern era financial transactions have long past been mainly done using digitally based transaction instructions for transferring fiat (real) money thus replacing the traditional actual money transactions.

In recent years the introduction of blockchain based cryptocurrencies has paved the way for further usage of digital currency, in fact virtual currency that is not regulated by any one single entity, such as states, central banks and/or the like.

While presenting many advantages, using the digital currencies, specifically the cryptocurrencies may present major security concerns since digital assets specifically the cryptocurrencies are regulated by vast computer networks which are inherently prone to malicious attacks. The trade using the digital assets essentially requires network connection which further exposes the electronic devices (digital wallets) storing the user accounts to such malicious attacks launched by malicious parties in attempt to gain control over the digital assets stored in these accounts.

SUMMARY OF THE INVENTION

According to a first aspect of the present invention there is provided a method of increasing security of digital assets stored in an isolated device, comprising using one or more processors of an isolated device associated with a user for:
  Associating the isolated device with a plurality of accounts of the user each configured to store a limited value of digital assets. Each of the plurality of accounts is assigned a respective one of a plurality of asymmetric cryptographic key pairs, each of the plurality of asymmetric cryptographic key pairs comprising a unique private key encrypting a respective account and a corresponding public key identifying the respective account.
  Transmitting, via a unidirectional secure channel, the public key assigned to each of the plurality of accounts to one or more computing nodes connected to a network comprising a plurality of computing nodes regulating the digital assets.
  Transferring a value of the digital assets by transmitting, to one or more of the computing nodes, the private key of one or more of the plurality of accounts storing a limited value of the digital assets equal to the transferred value thus releasing the limited value stored in the respective account(s).

According to a second aspect of the present invention there is provided an isolated device associated with a user for increasing security of digital assets stored in the isolated device, comprising:
  A unidirectional secure channel.
  A limited capacity interface configured to receive one or more limited length strings.
  A storage medium string a code.
  One or more processors coupled to the unidirectional secure channel, to the limited capacity interface, and to the storage medium, the one or more processor executes the code, the code comprising:
    Code instructions to associate the isolated device with a plurality of accounts of a user each configured to store a limited value of digital assets. Each of the plurality of accounts is assigned a respective one of a plurality of asymmetric cryptographic key pairs, each of the plurality of asymmetric cryptographic key pairs comprising a unique private key and a corresponding public key.
    Code instructions to transmit, via the unidirectional secure channel, the public key assigned to each of the plurality of accounts to one or more computing node connected to a network comprising a plurality of computing nodes regulating the digital assets.
    Code instructions to transfer a value of the digital assets by transmitting, to the one or more computing node, the private key of one or more of the plurality of accounts storing a limited value of the digital assets equal to the transferred value thus releasing the limited value stored in the one or more account.

In a further implementation form of the first and/or second aspects, the digital assets comprising a cryptocurrency. The isolated device is a cryptocurrency wallet.

In a further implementation form of the first and/or second aspects, the digital assets comprising instructions for digital transactions of a fiat money.

In a further implementation form of the first and/or second aspects, the limited value of digital assets is pre-defined.

In an optional implementation form of the first and/or second aspects, before transferring the value of digital assets, an overall value of the digital assets stored in the plurality of accounts reported by one or more of the computing nodes is validated according to a consensus among at least some of the plurality of computing nodes.

In a further implementation form of the first and/or second aspects, at any given time each of the plurality of accounts is in one of two states, in a ready-for-use state of the two states a respective account stores zero value of the digital assets and is hence available for storing at least part of a received value, in a used state of the two states the respective account stores the limited value of the digital assets and is hence unavailable for storing additional digital assets.

In a further implementation form of the first and/or second aspects, each of the plurality of accounts is configured to support multiple uses such that a respective account supports multiple transition cycles between the two states, wherein:
  A respective account which is currently in the ready-for-use state switches to the used state when at least part of a received value is stored in the respective account.

A respective account which is currently in the used state switches to the ready-for-use state when the limited value stored in the respective account is transferred from the isolated device. A new asymmetric cryptographic key pair is created for the respective account based on a number of use cycles identified for the respective account.

In an optional implementation form of the first and/or second aspects, a value of received digital assets is determined according to a received limited length string computed by one or more of the computing nodes. The received value is stored in one or more ready-for-use accounts of the plurality of accounts which are incrementally indexed according to a deterministically computed order shared by the isolated device and the computing nodes. The ready-for-use account(s) having an index subsequent to a most recently used account of the plurality of accounts is determined according to the received value and the limited value.

In a further implementation form of the first and/or second aspects, the transferred value is transferred from one or more used accounts of the plurality of accounts which most recently switched from the free-to-use state to the used state.

In a further implementation form of the first and/or second aspects, the plurality of asymmetric cryptographic key pairs is generated deterministically using a seed uniquely assigned to the user.

In an optional implementation form of the first and/or second aspects, the seed is generated randomly using one or more random number generators.

In a further implementation form of the first and/or second aspects, the plurality of asymmetric cryptographic key pairs assigned to the plurality of accounts are generated deterministically based on the seed and the index of each of the plurality of accounts.

In a further implementation form of the first and/or second aspects, a plurality of new asymmetric cryptographic key pairs is generated for the plurality of accounts during each initialization process conducted by the user for the isolated device. Each of the plurality of new asymmetric cryptographic key pairs is generated deterministically based on the seed, the index of a respective account and a number of initialization processes conducted for the isolated device.

In a further implementation form of the first and/or second aspects, the initialization process is a member of a group consisting of: a first-ever initialization process of the isolated device and a recovery process of the isolated device, the recovery process is conducted to restore the isolated device following one or more failures, for example, the isolated device experienced a memory erasure and/or the isolated device is associated with the user to replaces a scrapped isolated device of the user.

In a further implementation form of the first and/or second aspects, during each initialization process, the isolated device transmits, to one or more of the computing nodes. The public key generated for at least some of the plurality of accounts during each previous initialization process for a predefined number of use cycles.

In an optional implementation form of the first and/or second aspects, in case the transferred value is transferred from one or more used accounts in which a received value was stored prior to a most recent initialization, the isolated device transmits to one or more of the computing nodes the private key generated for the one or more account during all previous initialization processes to release the limited value stored in the one or more account.

In an optional implementation form of the first and/or second aspects, the new private key generated following each transition of each account from the used state to the free-for-use state is generated deterministically using an initialization seed computed based on the seed, the initialization process number and a use cycle number of the respective account such that the isolated device transmits the initialization seed of each previous initialization process to enable one or more of the computing nodes to derive the private key generated for at least some of the use cycles from the account seed.

In an optional implementation form of the first and/or second aspects, the initialization seed computed for each initialization process is deterministically derived from the initialization seed of a succeeding initialization process which is computed in advance for each of the plurality of accounts, such that the isolated device publishes the private key of one or more accounts for all previous initialization processes by transmitting the initialization seed of the most recent initialization.

In an optional implementation form of the first and/or second aspects, a backup value is computed to encode status information of the isolated device comprising one or more of: an overall value of the digital assets stored in the plurality of accounts and a number of initialization processes conducted for the isolated device.

In a further implementation form of the first and/or second aspects, during a restoration process one or more limited length strings are received to encode the backup value, the isolated device uses the backup value to validate at least some of the status information provided to the isolated device during a recovery process.

In an optional implementation form of the first and/or second aspects, the backup value is computed using the unique seed to support detection of false status information provided to the isolated device during the recovery process. The isolated device verifies the provided status information by matching between the backup value and another value computed for the received status information using the unique seed.

In a further implementation form of the first and/or second aspects, the backup value further includes a time of creation of the backup. The isolated device determines validity of the received status information based on the time of creation derived from the backup value.

In an optional implementation form of the first and/or second aspects, the value of the digital assets is transferred by communicating with a group of computing nodes of the plurality of computing nodes of the network. The private key of one or more accounts from which the transferred value is transferred is constructed as a plurality of key components each transmitted to a respective one of the computing nodes of the group. The private key required for releasing the limited value from the account(s) is constructed by aggregating the key components of a predefined subset of computing nodes of the group.

In an optional implementation form of the first and/or second aspects, another isolated device is used for storing, transferring and receiving the digital assets such that values of the digital assets are transferable between the isolated device and the another isolated device by publishing to each other a first partial data value and a second partial data value from which an asymmetric cryptographic key pair is derived for one or more accounts storing the transferred value.

In a further implementation form of the first and/or second aspects, the first partial data value is computed by the isolated device using a first unique seed assigned to the isolated device and the second partial data value is computed by the another isolated device using a second unique seed assigned to the another isolated device.

In an optional implementation form of the first and/or second aspects, each first partial data value is computed based on a preceding first partial data value such that given a certain first partial data value all first partial values succeeding the certain first partial data value are deterministically inferable from the certain first partial data value. Each second partial data value is computed based on a succeeding second partial data value such that given a certain second partial data value all second partial data values preceding the certain second partial data value are deterministically inferable from the certain second partial data value.

In a further implementation form of the first and/or second aspects, in order to transfer a value of the digital assets from the isolated device to the other isolated device, the isolated device shares with the another isolated device the first partial data value associated in the isolated device with a certain account of the plurality of accounts where the certain account and its preceding accounts cumulatively store a designated value of the digital assets defined by transferred value such that the another isolated device has access to the designated digital assets value stored in the certain account and its preceding accounts.

In a further implementation form of the first and/or second aspects, in order to transfer a value of the digital assets from the another isolated device to the isolated device, the another isolated device shares with the isolated device the second partial data value associated in the another isolated device with a certain account of the plurality of accounts where the certain account and its preceding accounts cumulatively store a designated value of the digital assets defined by transferred value such that the isolated device has access to the designated digital assets value stored in the certain account and its preceding accounts.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
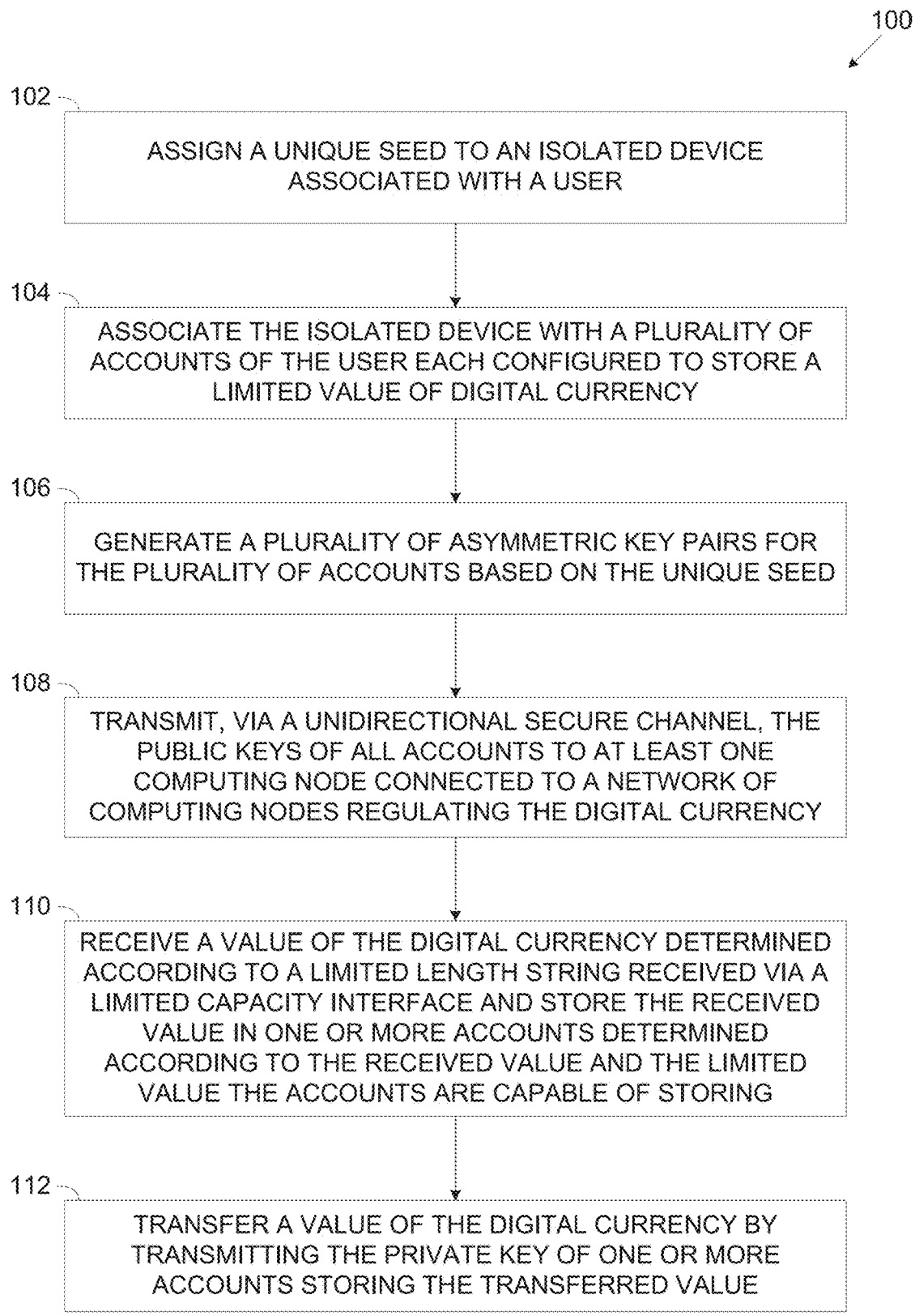
FIG. 1 is a flowchart of an exemplary process of associating a plurality of limited value accounts of a user with a limited connection isolated device to support digital assets transactions, according to some embodiments of the present invention.

The present invention, in some embodiments thereof, relates to improving security of digital assets stored in a limited connection isolated device, and, more specifically, but not exclusively, to improving security of digital assets stored in a limited connection isolated device using a plurality of limited value accounts.

According to some embodiments of the present invention, there are provided methods, systems and computer program products for dividing a digital assets account of a user to a plurality of limited value accounts associated with the user. The limited value accounts may be further associated with one or more isolated devices serving as a digital wallet (cold wallet) of the user, for example, a cryptocurrency wallet.

The digital assets may primarily refer to cryptocurrency but may further include other forms of digital assets, for example, instructions for digital transactions of fiat money, shares (stocks) and/or the like. The limited value of the digital assets and the number of limited value accounts may set to support storage of practically any value (amount) of the digital assets in the plurality of limited value accounts.

The isolated device may have a connection to a network, in particular to a device which is used for interacting with a community network of computing nodes, some of which may be untrusted and potentially malicious, deployed for distributed processing. Specifically the community network is deployed to regulate the digital assets, for example, a blockchain network deployed to regulate a cryptocurrency blockchain (e.g. Bitcoin, Ethereum, etc.) by maintaining a distributed ledger whose copy is individually marinated by each of the plurality of computing nodes of the community network.

In order to isolate the isolated device from the network as much as possible the isolated device may be configured to support a unidirectional secure channel for transmitting data to at least some of the computing nodes of the community network while supporting only a very limited (data) capacity input interface disconnected and hence isolated from the network. The limited capacity input interface may be operated manually and/or automatically. For example, the limited capacity input interface may include a user input interface which may receive limited length strings inserted by an associated user. In another example the limited data input interface may include a computer punched card reader configured to read data encoded in punched cards inserted manually and/or automatically to the computer punched card reader. As such the isolated device is practically isolated from the network and is therefore highly immune to network based attacks.

Each of the plurality of limited value accounts is associated with a respective asymmetric cryptographic key pair generated by the isolated device. Each asymmetric cryptographic key pair comprises a unique private key for encrypting the respective limited value account and a corresponding public key serving as address to identify the respective limited value account. Encryption of the limited value account with the private key means that the digital assets stored in a certain limited value account may only be accessed (for transfer) using the respective private key. The public key is used to transfer digital assets into (receive) the respective limited value account.

After generating the asymmetric cryptographic key pairs for the limited value accounts, the isolated device may publish the public keys of at least some of the accounts to one or more of the computing nodes of the community network regulating the digital assets, for example, the blockchain network. As such, according to the public keys, digital assets transferred (received) from one or more other users may be stored in one or more of the accounts.

Naturally, a plurality of digital assets receive transactions may be conducted without involving the isolated device (cold wallet) since the received digital assets values transferred to the limited value accounts are logged by the community network, for example, in the blockchain distributed ledgers maintained by the plurality of computing nodes.

Updating the isolated device with the digital assets receive transaction(s) may typically be done either to maintain the isolated device up to date and/or prior to making a transfer transaction of digital assets to one or more of the other users. This is since in order to make a transfer of the digital assets, the isolated device first needs to identify which of its associated limited value accounts actually stores digital assets.

One or more of the computing nodes and/or an access device used by the user as a hot wallet may compute a limited length string encoding the value of digital assets stored in the limited value accounts associated with the isolated device. The computed limited length string may be then inserted to the isolated device via its limited capacity input interface. The isolated device may decode the limited length string to identify the value of the digital assets stored in its associated limited value accounts.

Since the isolated device may receive only very limited input data via the limited capacity input interface, typically inserted (typed) manually by the user, informing the identifying to the isolated device each account storing digital assets may be an effort intensive, tedious and error prone process.

To overcome this limitation, the access device (hot wallet) is configured to maintain a subsequent ordering in which received digital assets funds are stored in subsequent limited value accounts according to an incrementing index assigned to each of the accounts. As such, reposting (updating) the isolated device with the digital assets stored in the accounts may be done by simply computing a limited length string encoding the overall digital assets value stored in all the accounts associated with the isolated device.

The isolated device may extract the reported overall digital assets value. Due to the subsequent ordering and based on the extracted overall digital assets value and the limited value that each of the limited value accounts may store, the isolated device may identify which of the limited value accounts are used (i.e. in a used state). Inherently, due to the subsequent ordering, the used accounts are subsequent accounts having the lowest indexes.

Optionally, the isolated device validates with at least some of the computing nodes of the community network the reported digital assets value using validation methods described in Provisional Patent Application No. 62/775,942 titled "Secure Consensus over a Limited Connection", filed on Dec. 6, 2018, the contents of which are incorporated herein by reference in their entirety.

In order to transfer a value of the digital assets to one or more accounts of one or more of the other users, the isolated device may publish to at least part of the community network, the private key of one or more of the used limited value accounts which cumulatively store the transferred value. The isolated device publishes the private key(s) by transmitting these private key(s) via the unidirectional secure channel to the access device and/or to one or more of the computing nodes serving as the hot wallet. Once the private key(s) are publicly available, the digital assets funds stored in the respective accounts are accessible and may be transferred out to the account(s) of the other user(s).

In order to continuously maintain the subsequent ordering and avoid a situation where one or more accounts which do not store digital assets are located between accounts which do store digital assets, the limited value accounts are configured to support multiple uses. This means that each of the limited value accounts may receive digital assets, then have the digital assets transferred out, receive digital assets again and so on. Each of the limited value accounts may therefore go through a plurality of use cycles in which its transitions between a ready-for-use state and the used state.

Since the isolated device publishes the private key of each released account from which digital assets is transferred, the publicly known private key is now unusable and the isolated device may generate a new private key for the released account(s). The new private key will be used for the released account(s) in their next use cycle. Moreover, the isolated device may generate deterministically, based on a unique seed assigned to the isolated device, new asymmetric cryptographic key pairs for each these released account. After created, the isolate device may publish the public key (included in the newly generated cryptographic key pairs) of these accounts thus making them reusable again and available to receive digital assets. For example, the isolated device may apply one or more deterministic key derivation functions, for example, a hash function to produce the asymmetric cryptographic key pair based on the unique seed and the index number of the limited value account.

According to some embodiments of the present invention the isolated device is configured to support multiple initialization processes, specifically multiple recovery processes following a first-ever initialization process. The recovery processes may be conducted following one or more failures to the isolated device, for example, memory erasure, using a new isolated device to replace a previously used scrapped isolate devices and/or the like. After such failures, the isolated device needs to be restored and re-associated with the plurality of limited value accounts created for the user and which are logged by the community network and may already store digital assets funds. Due to the failure, while historical digital assets transactions conducted in the limited value accounts of the user are tracked and logged by the community network, for example, the blockchain network, the isolated device itself may not store this historical track record and the digital assets funds stored in the limited value accounts may thus not be available to the user.

During each initialization process, either for the first-ever initialization and for each recovery process, the isolate device may generate deterministically, based on the unique seed assigned to the isolated device, a plurality of new asymmetric cryptographic key pairs for the plurality of limited value accounts. For example, the isolated device may apply one or more deterministic key derivation functions, for example, a hash function to produce the asymmetric cryptographic key pair based on the unique seed, the index number of the limited value account and the initiation number (i.e. the number of initialization process conducted for the isolated device and/or the associated user).

Moreover, since the isolated device does not have the historical track record and since one or more of the limited value accounts may have been used during different initialization sequences, the isolated device may be unaware of which of the limited value accounts are used and are storing digital assets, for example, in the cryptocurrency blockchain. Therefore in order to identify the limited value accounts which are in use, i.e. store digital assets, the isolated device may reproduce, using the unique seed, the asymmetric cryptographic key pairs generated during all previous initialization processes and for all use cycles of at least some of the limited value accounts.

The isolated device may then publish, to the community network, the public keys of at least some of the accounts generated during all previous initialization processes such that one or more of the computing nodes and/or the access device (hot wallet) may use the public keys to identify which of the limited value accounts associated with the restored isolated device are used, i.e. store digital assets.

According to some embodiments of the present invention, in order to reduce the communication load by reducing the number of private keys transmitted by the isolated device to the community network when transferring digital assets out of one or more used accounts following an initialization process, the isolated device may compute the asymmetric cryptographic key pairs for each account during each initialization process as a derivative from a previous initialization process. Following an initialization process (specifically a recovery process), the isolated device may lose its track record of receive and transfer operations of digital assets done to its associated limited value accounts. The isolated device may therefore be unable to determine the private key of one or more of the used limited value accounts since they may be loaded with digital assets during previous initialization process. As such in order to transfer control (release) of used limited value account(s) from which digital assets is to be transferred out, the isolated device may publish a certain value from which the most recent asymmetric cryptographic key pair(s) was derived. Using this certain value, the computing nodes and/or the access device serving as the hot wallet may infer the private key(s) (and hence the public key(s) which are derived from the respective private keys) created for the limited value account(s) during all previous initialization processes and for all use cycles. This eliminates the need to transmit separately the private key created for a certain limited value account from which digital assets are transferred (sending funds) during each use cycle and for each initialization process thus significantly reducing the communication load.

According to some embodiments of the present invention, in order to further protect the digital assets stored in the limited value account, the user may be associated with multiple isolated devices, specifically two isolated devices. The two isolated devices are configured such that each of the isolated devices has control over only part of the limited value accounts and may not access the other accounts. Control over limited value accounts, in particular used accounts storing digital assets may be transferred between the two isolated devices where control over an account enable access to the digital assets stored in that account. For example, a first isolated device may serve as a cold wallet as described herein before while a second isolated device may serve as a very cold wallet which may be stored in a highly secure and inaccessible location, for example, a vault and/or the like.

Using the plurality of limited value accounts may present major benefits and advantages compared to existing methods for storing digital assets, specifically cryptocurrency. First, since each of the accounts stores only a limited value of the digital assets owned by the user, even if one or more of the accounts are compromised by a malicious party, the malicious party may have access only to a limited value of the digital assets owned by the user. This is in contrast to currently existing methods in which the user may be associated with a single account storing all the digital assets owned by the user. In such methods compromising the single account may lead to a complete loss of the digital assets funds of the user.

Moreover, using the two isolated devices (cold and very cold wallets) which are each exclusively controlling only part of the limited value accounts may further increase the immunity and robustness of the limited value accounts to compromising by the malicious party since even if one of the isolated devices is compromised the malicious party may not access the account which are controlled by the other device.

Furthermore, the multitude of limited value accounts may raise some management, tracking and logging issues which may burden the user with a major time consuming and tedious effort which may be prone to errors for updating the isolated device having the limited capacity input interface for receiving data. Applying the subsequent ordering may significantly reduce the updating process as only a very limited amount of data may be provided to the isolated device from which it may automatically and deterministically derive all or at least most of the information required for management, tracking and logging the usage of the limited value accounts.

Generating the asymmetric cryptographic key pair during the recovery processes as derivations from asymmetric cryptographic key pairs generated during the preceding initialization process (first-ever initialization or recovery) may significantly reduce the volume of data transmitted by the isolated device to the community network when transferring digital assets out of used limited value accounts which the isolated device, having no track record following initialization process(es), may be unable to determine, thus significantly reducing the network load.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of associating a plurality of limited value accounts of a user with a limited connection isolated device to support digital assets transactions, according to some embodiments of the present invention. An exemplary process 100 may be executed by an isolated device having limited connectivity (connection) which is used as a digital wallet for storing digital assets, for example, a cryptocurrency (e.g. Bitcoin, Ethereum, etc.). In another exemplary embodiment the isolated device may be used to issue instructions for digital transactions of a fiat money (real currency) and as such, the instructions for the digital transactions may be regarded as digital assets. In another exemplary embodiment the isolated device may be used for shares (stocks) of one or more financial entities, for example, a company, a corporation, an investment fund and/or the like. The isolated device is typically associated with a user who uses the isolated device to store his digital assets in a secure manner.

In particular, the isolated device may have a unidirectional (one-way) secure connection which is physically tamper resistant which is used for outputting (transmitting) data to one or more devices in particular, devices connected to a network of computing nodes regulating the digital assets, for example, a blockchain network maintaining a blockchain, in particular a cryptocurrency blockchain. The isolated device may further include a limited input interface used for receiving manually and/or automatically inserted limited data volumes, in particular limited length strings. Being highly isolated from any network, for example, the blockchain network, the isolated device is therefore highly robust and immune to network attacks initiated by malicious parties, specifically for compromising and/or gaining access and control over the digital assets stored in the isolated device.

In order to improve security of the digital assets funds stored in the isolated device, exposure of the isolated device to malicious attacks and compromising risk may be limited by splitting the digital assets stored in the isolated device into a plurality of accounts each configured to store a limited value of the digital assets. As such even if one or more of the limited value accounts are compromised the malicious party may gain access and control over only a significantly small value of the digital assets funds of the user.

In case the isolated device is capable to attach to a backup storage device, for example, a storage stick and/or the like the limited value may be dynamically set and adjusted according to one or more allocation parameters, for example, a desired granularity of the limited value in the accounts, an overall digital assets stored in the isolated device and/or the like. However, since it is desired to maintain the isolated device highly immune to external threats the limited value may be pre-defined for the plurality of accounts. The limited value may be similar for all the accounts or it may be set according to one or more pre-defined schemes which are shared by the isolated device and the network of computing nodes regulating the digital assets.

When a value of the digital assets is received, i.e. transferred to the associated user from one or more other accounts associated with other users, the received value is stored in one or more of the limited value accounts which are capable of cumulatively storing the received value. When a value of the digital assets is transferred, i.e. transferred from the associated user to one or more other accounts associated with other users, the transferred value is transferred from one or more of the limited value accounts which cumulatively store the transferred value.

Figure 2:
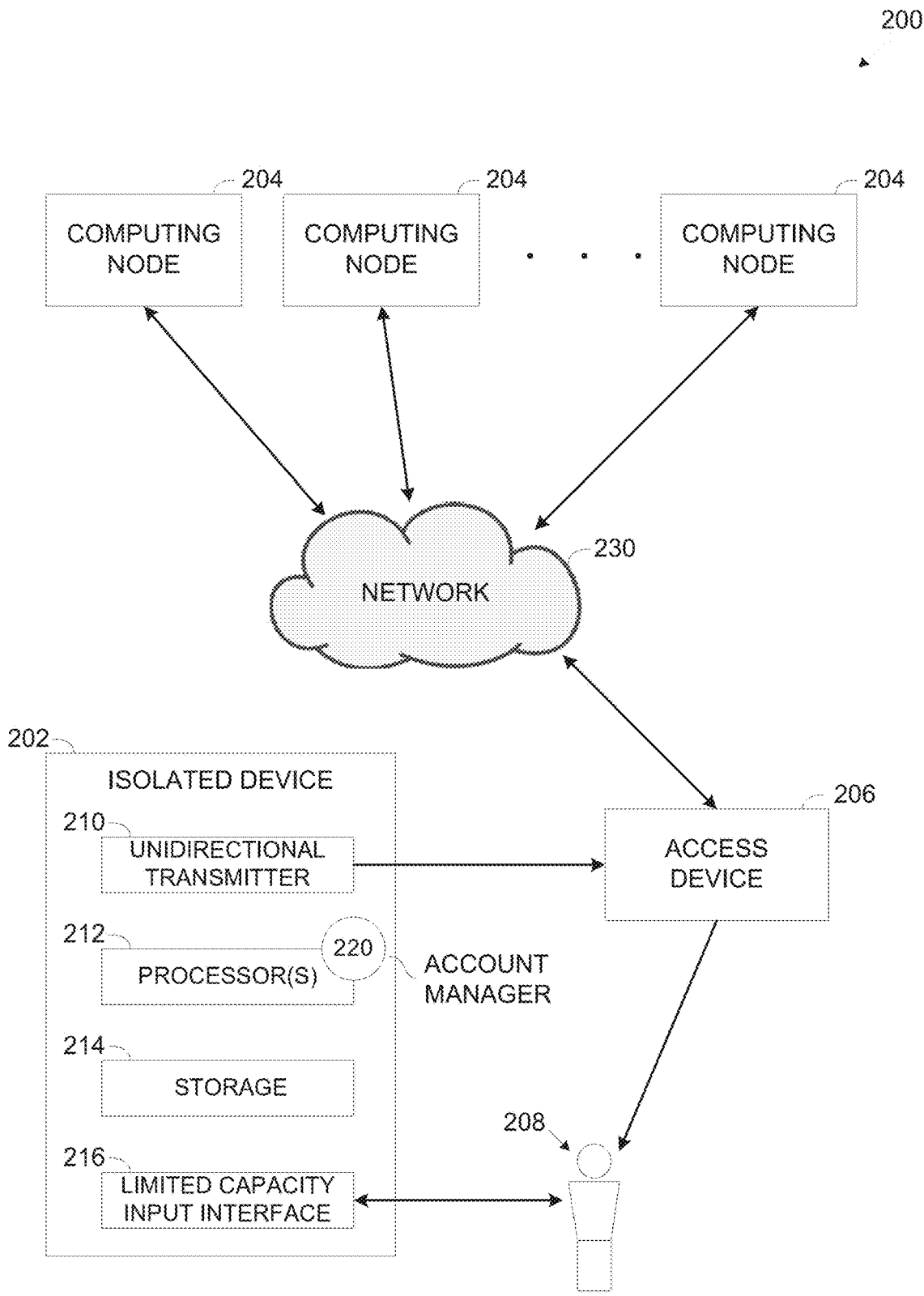
FIG. 2 is a schematic illustration of an exemplary system for associating a plurality of limited value accounts of a user with a limited connection isolated device to support digital assets transactions, according to some embodiments of the present invention.

Reference is also made to FIG. 2, which is a schematic illustration of an exemplary system for associating a plurality of limited value accounts of a user with a limited connection isolated device to support digital assets transactions, according to some embodiments of the present invention. An exemplary system 200 may include an isolated device 202 adapted to communicate with a community network comprising a plurality of computing nodes 204 which regulate the digital assets, for example, a blockchain network maintaining a distributed ledger blockchain to track, log and record cryptocurrency transactions.

The computing nodes 204 may include for example, a computer, a server, a processing node, a network node, a cloud computing resource, a Smartphone, a tablet and/or the like capable of communicating with each other via a network 230 comprising one or more wired and/or wireless networks, for example, a Local area Network (LAN), a Wireless LAN (WLAN), a Wide Area Network (WAN), a Municipal Area Network (MAN), a cellular network, the internet and/or the like.

The isolated device 202 may comprise a unidirectional transmitter 210 to facilitate a unidirectional (one-way) secure communication channel with one or more other devices, a processor(s) 212 for executing a process such as the process 100 and storage 214 for storing program code (program store) and/or data. The isolated device 202 may further include a secure limited capacity input interface 216 for receiving limited and typically very low volume data. The isolated device 202 may be associated with a user 208.

According to some embodiments of the present invention, specifically for the cryptocurrency blockchain applications, the isolated device 202 may facilitate a cold wallet associated with an account of the user 208 to store the cryptocurrency funds of the associated user 208. As the cold wallet isolated device 202 is disconnected and thus isolated from the network 230, the cold wallet may be highly immune to network based malicious attacks directed to compromise the cold wallet in order to gain access and control of the account and possibly transfer cryptocurrency funds from the cold wallet.

The unidirectional transmitter 210 may include one or more wired, wireless and/or optical transmitting interfaces adapted for data transmittal only and thus unable to receive data. The unidirectional transmitter 210 may be physically tamper resistant such that compromising data transmitted from the unidirectional transmitter 210 is impossible and/or detectable and reported. Moreover, the unidirectional transmitter 210 may transmit encrypted data thus forming a reliable and secure unidirectional (one-way) communication channel. The unidirectional transmitter 210 may include for example, a light based (e.g. infrared, laser, etc.) transmitter configured for optically encoding data. In particular, the unidirectional transmitter 210 may transmit a directed light pattern directed to a specific receiver which may not be intercepted by potentially (eavesdropping) malicious devices. In another example, the unidirectional transmitter 210 may include a wired and/or wireless transmitter, for example, a serial transmitter, a Radio Frequency (RF) transmitter configured for transmitting data over wire and/or over the air. In another example, the unidirectional transmitter 210 may include a display, for example, a screen, a projector and/or the like for displaying a QR code encoding data which may be scanned and recovered for transmission to one or more of the computing nodes 204. In another example, the unidirectional secure communication channel may be implemented using a hardware storage media, for example, a CD-ROM disk and/or the like preferably a onetime use disposable disk. In such case, the unidirectional transmitter 210 may include a media access interface adapted for writing, burning and/or programming data to the hardware storage media. The burned hardware storage media may be then provided to the one or more of the computing nodes 204 thus securely transferring data from the isolated device 202 to the computing nodes 204.

The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute an account manager application 220 for executing the process 100. The account manager 220 may further utilize and/or facilitate one or more hardware elements integrated and/or coupled with the isolated device 202, for example, a circuit, a component, an Integrated Circuit (IC), an Application Specific Integrated Circuit (ASIC), a Field Programmable Gate Array (FPGA), a Digital Signals Processor (DSP) and/or the like. For example, the account manager 220 may use a random number generator for creating one or more encryption keys, for example, an asymmetric encryption key pair comprising a private key and a public key as known in the art. In another example, the account manager 220 may use a Hardware Security Module (HSM) to utilize one or more functions, for example, public key infrastructures (PKIs), message signing, key injection, database encryption and/or the like.

The limited capacity input interface 216 may be configured to receive limited and typically very low volume of data which may be manually and/or automatically inserted. For example, the limited capacity input interface 216 may include one or more user interfaces such as, for example, a keyboard, a touchscreen and/or the like for interacting with the user 208 to receive textual strings of data typed in by the associated user 208. In another example, the limited capacity input interface 216 may include a computer punched card reader configured to read data, for example, strings encoded in one or more punched cards inserted manually and/or automatically to the computer punched card reader. The user interface may further include one or more output interfaces, for example, a display, a speaker, an earphone and/or the like for outputting data to the user 208.

Due to the nature and deployment of the computing nodes 204 which may be located in different geographical locations, the isolated device 202 may communicate with one or more of the computing nodes 204 via one or more access devices 206 connected to the network 230. The access device 206 may receive data from the isolated device 202 via the unidirectional secure communication channel facilitated by the unidirectional transmitter 210 and broadcast the received data to one or more of the computing nodes 204 over the network 230. For example, the access device 206 may include an optic receiver configured to receive optically encoded data transmitted by the light source unidirectional transmitter 210 of the isolated device 202. In another example, the access device 206 may include a wired and/or wireless receiver configured to receive data transmitted by the wired and/or wireless unidirectional transmitter 210 of the isolated device 202. In another example, the access device 206 may include a scanner configured to scan and recover data from a QR code generated and displayed by the display unidirectional transmitter 210 of the isolated device 202.

Moreover, the access device 206 may be facilitated, for example, by a computing node such as the computing nodes 204 which is part of the community network and is accessible to the user 208, for example, a Smartphone, a tablet, a computer, a server and/or the like. In another example, the access device 206 may include a networked device accessible to the user 208, for example, a Smartphone, a tablet, a laptop, a desktop, a smart watch, smart glasses and/or the like which is not part of the community network but capable of communicating with one or more of the computing nodes 204 via the network 230.

The access device 206 may be configured to present to the user 208 information received from the community network of computing nodes 204. For example, the access device 206 may present status information relating to the digital assets account stored by the isolated device 202. Moreover, the access device(s) 206 may present one or more limited length strings computed based on the account status information received from the community network. As such, specifically in case the isolated device 202 is the cold wallet storing the cryptocurrency account of the user 208, the access device 206 may be regarded as a hot wallet, i.e. a device associated with the user 208 that is connected to the community network via the network 230.

As described herein before, the data transmitted by the isolated device 202 over the unidirectional secure communication channel facilitated by the unidirectional transmitter 210 may be encrypted. The encryption may be facilitated using one or more encryption schemes, for example, encryption-decryption key pairs uniquely associated with each of at least some of the computing nodes 204 to encrypt the data transmitted to the respective computing node 204 thus establishing a unidirectional secure and reliable channel with each of the at least some computing nodes 204. The isolated device 202 may also be associated with such an encryption-decryption key pair to support verification of data received by the isolated device 202 and authentication of data transmitted from the isolated device 202. In particular, the encryption-decryption key pairs associated with the computing nodes 204 may include, for example, an asymmetric cryptographic key pair comprising a private key and a public key and/or the like. The public key of the asymmetric cryptographic key pair associated with each computing node as well as the isolated device 202 is publicly shared and thus serves as basis for the address of the respective device. For example, the address of each limited value account may be created by applying one or more hash functions to the public key thus generating a hash value serving as the address of the respective limited value account. The private key of the asymmetric cryptographic key pair associated with each computing node 204 as well as the private key of the isolated device 202 are kept secret and are only available to the respective device which, using its private key, is the only device capable of decrypting messages addressed to it.

To facilitate the encrypted data transmission, the encryption (public) key of each of at least some of the computing nodes 204 must be available to the isolated device 202. Specifically, the isolated device 202 must obtain the encryption (public) key of the access device 206. These encryption key(s) of the computing nodes 204 and/or of the access device 206 may be provided to the isolated device 202 using one or more techniques. For example, the encryption key associated with one or more of the computing nodes 204 may be provided to the isolated device 202 through the limited capacity input interface 216, for example, as a limited length string inserted (typed in) by the user 208 and/or encoded in one or more punched cards inserted manually and/or automatically to the limited capacity input interface 216. Optionally, the encryption key associated with at least some of one or more of the computing nodes 204 is made available to the isolated device 202 using one or more trusted controllers as described in Provisional Patent Application No. 62/775,942 titled "Secure Consensus over a Limited Connection", filed on Dec. 6, 2018, the contents of which are incorporated herein by reference in their entirety.

The process 100 and the system 200 are described herein for a single isolated device 202 associated with a single user 208 and connecting to the network 230 via a single access device 206. However, this should not be construed as limiting since the process 100 and the system 200 may be expanded to support a plurality of isolated devices 202 associated with respective users 208 and connecting to the network 230 via multiple access devices 206.

Also, for clarity the isolated device 202 is described to execute the process 100 herein after. However, it should be clear that the account manager 220 executed by the processor(s) 212 of the isolated device 202 is the software module which in fact executes the process 100.

As shown at 102, the process 100 starts with assigning the isolated device 202 with a seed uniquely associated with the user 208 of the isolated device 202. The unique seed is associated with the user 208 for use with the digital assets, i.e. digital assets transactions (receive and/or transfer). The user 208 may store, log and/or record the unique seed in order to support restoration, re-initialization and/or failure recovery of the isolated device 202 and/or one or more other isolated devices 202 associated with the digital assets account of the user 208.

In case the user 208 does not have an associated unique seed, the seed may be initially generated using one or more methods and/or implementations. For example, the user 208 may use one or more devices based on a random number generator to generate the unique seed and insert the seed to the isolated device 202 using the limited capacity input interface 216, for example, typing the seed as a limited length string. In another example, the isolated device 202 operated by the user 208 may generate the unique seed using one or more integrated random number generators. In such case the isolated device 202 may present the generated seed to the user 208 through one or more of its user interfaces, for example, the display, the speaker and/or the like to enable the user 208 to store, log and/or record the generated seed.

In case of a recovery process of the isolated device 202 which is described here in after in detail, the user 208 may already have an associated unique seed and may therefore insert the seed to the isolated device 202 using the limited capacity input interface 216.

As shown at 104, the isolated device 202 is associated with a plurality of accounts each configured to store a limited value of the digital assets. The digital assets may include, for example, a cryptocurrency (e.g. Bitcoin, Ethereum, etc.). In another exemplary embodiment the digital assets may include instructions for digital transactions of a fiat money (real currency).

The limited value defined for each of the limited value accounts may be pre-defined. The limited value may be similar for all the limited value accounts or it may be set according to one or more pre-defined schemes which are shared by the isolated device 202 and the network of computing nodes 204 regulating the digital assets. For example, the first account may be set to store a certain digital assets value and each account may store a double value of the digital assets compared to its preceding account. The number of limited value accounts may be set according to one or more of the allocation parameters. For example, the number of accounts may be set to support storing the entire value of the digital value available on the market. Optionally, the isolated device 202 may be initially assigned with a certain number of accounts and in case of need additional accounts may be defined, created and assigned to the isolated device 202.

Each limited value account is assigned with an asymmetric cryptographic key pair comprising a private key and a public key. The public key of each limited value account which is published to the community network may serve as an address of the respective account to identify the respective account. In practice, the address of each limited value is derived from the public key, for example, applying one or more of the hash functions to generate a hash value from the public key. The address of each limited value account may be used (by other users) for transferring digital assets funds, specifically the limited value of the digital assets to the respective account. The private key of each limited value account is available only to the isolated device 202 and may be used to encrypt the respective account such that only the isolated device 202 may access and transfer digital assets funds, specifically the limited value of the digital assets stored in the respective account to other accounts, typically of other users.

For example, in the cryptocurrency embodiments where the isolated device 202 serves as the cold wallet, a hash value computed for the public key of each account using one or more hash functions may serve as the address of the respective account. The hash value may be used by other users to transfer the limited value of the cryptocurrency into the respective account, i.e. the isolated device 202 receives a cryptocurrency value. The private key of each account may be used by the isolated device 202 access the respective account in order to transfer the limited value of the cryptocurrency stored in the respective account to other users.

As shown at 106, the isolated device 202 generates a plurality of asymmetric cryptographic key pairs for the plurality of limited value accounts. The isolated device 202 generates the asymmetric cryptographic key pairs in a deterministic manner based on the unique seed assigned to the isolated device 202 such that given the unique seed the same asymmetric cryptographic key pair may be generated and re-generated for each of the accounts. In particular, the isolated device 202 may compute, based on the unique seed, an account seed for each of the plurality of limited value accounts. For example, the isolated device 202 may compute the account seed of each account based on an index of the respective account. Based on the account seed of each limited value account, the isolated device 202 may generate the asymmetric cryptographic key pair for the respective account.

Figure 3:
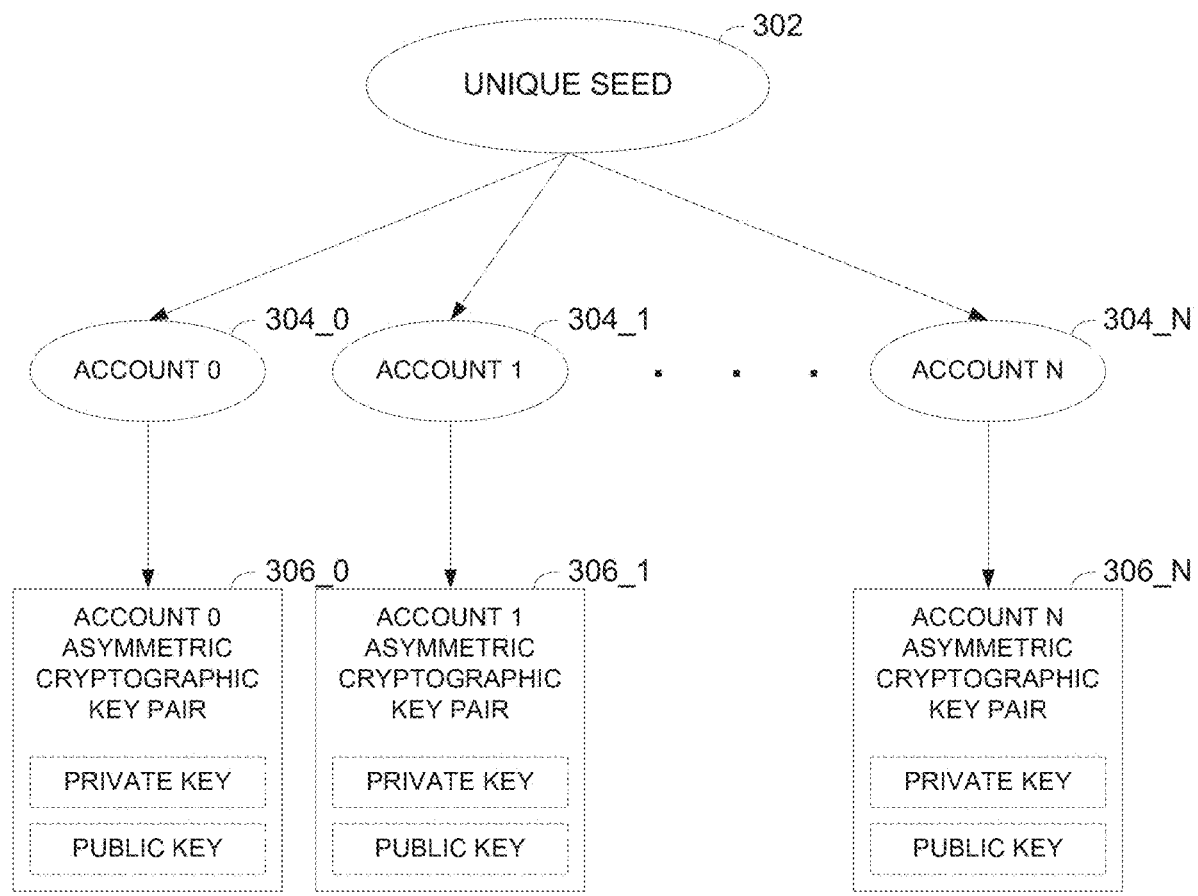
FIG. 3 is a schematic illustration of an exemplary construction of asymmetric cryptographic key pairs for a plurality of limited value accounts associated with a limited connection isolated device used for storing digital assets, according to some embodiments of the present invention.

Reference is now made to FIG. 3, which is a schematic illustration of an exemplary construction of asymmetric cryptographic key pairs for a plurality of limited value accounts associated with a limited connection isolated device used for storing digital assets, according to some embodiments of the present invention. An isolated device such as the isolated device 202 assigned with a unique seed 302 may generate, based on the unique seed 302, an asymmetric cryptographic key pair 306 for each of a plurality of limited value accounts. Each of the asymmetric cryptographic key pairs 306 comprising a unique private key for encrypting the respective limited value account 304 and a public key serving as address to identify the respective limited value account 304. For example, the isolated device 202 may generate, based on the seed 302, an asymmetric cryptographic key pair 306_0 for the limited value account 302_0 indexed with the index 0. In another example, the isolated device 202 may generate, based on the seed 302, an asymmetric cryptographic key pair 306_1 for the limited value account 304_1 indexed with the index 1. In another example, the isolated device 202 may generate, based on the seed 302, an asymmetric cryptographic key pair 306_N for the limited value account 304_N indexed with the index N.

The isolated device 202 may apply one or more key derivation functions, algorithms and/or techniques for deterministically generating the asymmetric cryptographic key pairs 306 such that the asymmetric cryptographic key pairs 306 may be reproduced given the unique seed 302. For example, the isolated device 202 may use one or more hash functions to generate the asymmetric cryptographic key pairs 306. For example, the isolated device 202 may compute the private key of each of the accounts 304 according to a formulation expressed in equation 1 below.

$$\text{private key} = \text{HASH}(\text{seed}, \text{account index}). \quad \text{Equation 1:}$$

The respective public key may derived from the private key as known in the art and may be designated as ADR(account index) where ADR stands for address. Specifically, as described herein before, for the cryptocurrency embodiments the address (ADR) may be a hash value computed for the public key using one or more hash functions.

Reference is made once again to FIG. 1.

As shown at 108, the isolated device 202 publishes the public keys, i.e. the addresses of at least some of the plurality of limited value accounts by transmitting the public keys of the accounts to the community network, for example, via the unidirectional secure channel to the access device 206. Once transmitted to the community network digital assets may be transferred into one or more of the limited value accounts using their respective public keys. For example, in the cryptocurrency embodiments, the isolated device 202 may transmit the public keys to the blockchain network to allow one or more other users, i.e. cryptocurrency owners to transfer cryptocurrency to one or more of the limited value accounts associated with the isolated device 202.

Figure 4:
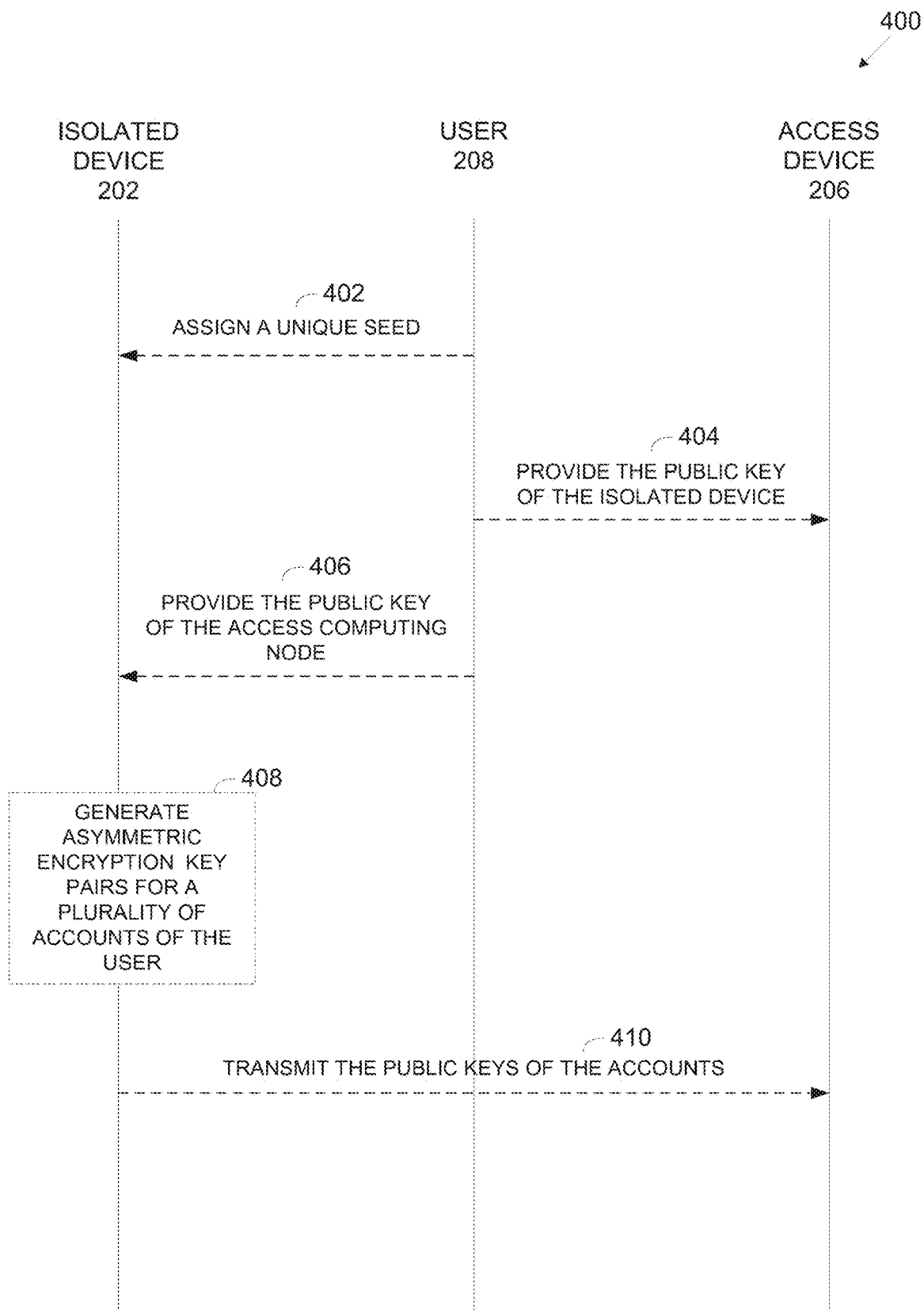
FIG. 4 is a schematic illustration of an exemplary initialization sequence of a limited connection isolated device used for storing digital assets in a plurality of limited value accounts, according to some embodiments of the present invention.

Reference is now made to FIG. 4, which is a schematic illustration of an exemplary initialization sequence of a limited connection isolated device used for storing digital assets in a plurality of limited value accounts, according to some embodiments of the present invention. An exemplary initialization sequence 400 may be executed to initialize an isolated device such as the isolated device 202. First, a user such as the user 208 associated with the isolated device 202 may assign 402 a unique seed to the isolated device as described in step 102 of the process 100.

The isolated device 202 naturally needs to communicate with the access device 206, in particular via secure communication over the unidirectional secure channel. For example, in the cryptocurrency embodiments where the isolated device 202 serves as the cold wallet and the access device 206 serves as the hot wallet, the cold wallet communicates with the hot wallet in order to conduct cryptocurrency transactions.

The user 208 may therefore provide 404 the public key of the isolated device 202 to the access device 206. This public key which is not to be confused with the public keys of the limited value accounts may be used to authenticate messages received from the isolated device 202. For example, assuming the isolated device 202 transmits encrypted messages to the access device 206 via the unidirectional secure channel. Using the public key of the isolated device, the access device 206 may verify that the encrypted messages originate from the isolated device 202. Similarly the user 208 may provide 406 the public key of the access device 206 to the isolated device 202. Using the public key of the access device 206, the isolated device may authenticate data received from the access device 206. In particular, the isolated device 202 may verify limited length strings generated by the access device 206 which are inserted to the isolated device 202 via the limited capacity input interface 216.

The isolated device 202 may generate 408 the asymmetric cryptographic key pairs for the plurality of limited value accounts associated with the isolated device 202 as described in step 106 of the process 100. The isolated device 202 may then transmit 410 the public keys of at least some of the limited value accounts to the community network via the access device 206 as described in step 108 of the process 100.

Reference is made once again to FIG. 1.

Naturally, since the limited value accounts are configured to store the limited value, each of the accounts may be in one of two states. In the first state, a ready-for-use state, a respective account may store zero value of the digital assets and is hence available for storing digital assets received by the isolated device 202. In particular, the respective ready-for-use account may store the limited value which may constitute at least part of the received digital assets value. In the second state, a used state, the respective account already stores the limited value of the digital assets and is hence unavailable for storing additional digital assets that may be received by the isolated device 202.

As shown at 110, the isolated device 202 may receive a value of the digital assets transferred by one or more other users to one or more of the limited value accounts associated with the isolated device 202. As described herein before, the public keys of at least some of the limited value accounts were published to the community network thus allowing the other user(s) to transfer digital assets to the limited value accounts of the isolated device 202.

Naturally, a plurality of digital assets receive transactions may be conducted without involving the isolated device 202 (cold wallet) but rather only the access device 206 (hot wallet) since the received digital assets values are logged by the community network, for example, in the blockchain distributed ledgers maintained by the plurality of computing nodes 204.

The received digital assets may be stored in one or more of the limited value accounts which are in the ready-for use state and which are switched (transitioned) to the used state after the limited value (which is at least part of the received value) is stored in them.

Updating the isolated device 202 with the digital assets receive transaction(s) may typically be done either to maintain the isolated device 202 up to date and/or prior to making a transfer transaction of digital assets to one or more other users. This is since in order to make a transfer of the digital assets, the isolated device 202 first needs to identify which of its associated limited value accounts actually stores digital assets, i.e. which of the accounts are in the used state. After identifying accounts storing digital assets, the isolated device 202 may transfer the digital assets limited value stored in one or more of the used accounts.

The access device 206 may compute a limited length string encoding the value of digital assets stored in the limited value accounts associated with the isolated device. The computed limited length string may be then inserted to the isolated device 202 via the limited capacity input interface 216. The isolated device 202 may then decode the limited length string to identify the value of the digital assets stored in the limited value accounts associated with the isolated device 202.

The isolated device 202 may receive only very limited input data via the limited capacity input interface 216, typically inserted (typed) manually by the user 208. Therefore specifically identifying each of the accounts storing digital assets to the isolated device 202 may be an effort intensive, tedious and error prone process.

In order to overcome this obstacle, the access device 206 is configured to store received digital assets funds in subsequent limited value accounts according to their indexes starting from the first account having the index 0. To report the digital assets stored in the accounts to the isolated device, the access device 206 may simply compute a limited length string encoding the overall digital assets value stored in the accounts associated with the isolated device 202.

The isolated device 202 may extract the reported digital assets value and based on the reported value and the limited value that each of the accounts may store, the isolated device 202 may identify which of the limited value accounts are in the used state, i.e. which account(s) store their designated limited value of the digital assets.

Optionally, the isolated device 202 validates with at least some of the computing nodes 204 the digital assets value reported by the access device 206 using the validation methods described in Provisional Patent Application No. 62/775,942 titled "Secure Consensus over a Limited Connection", filed on Dec. 6, 2018, the contents of which are incorporated herein by reference in their entirety.

Figure 5:
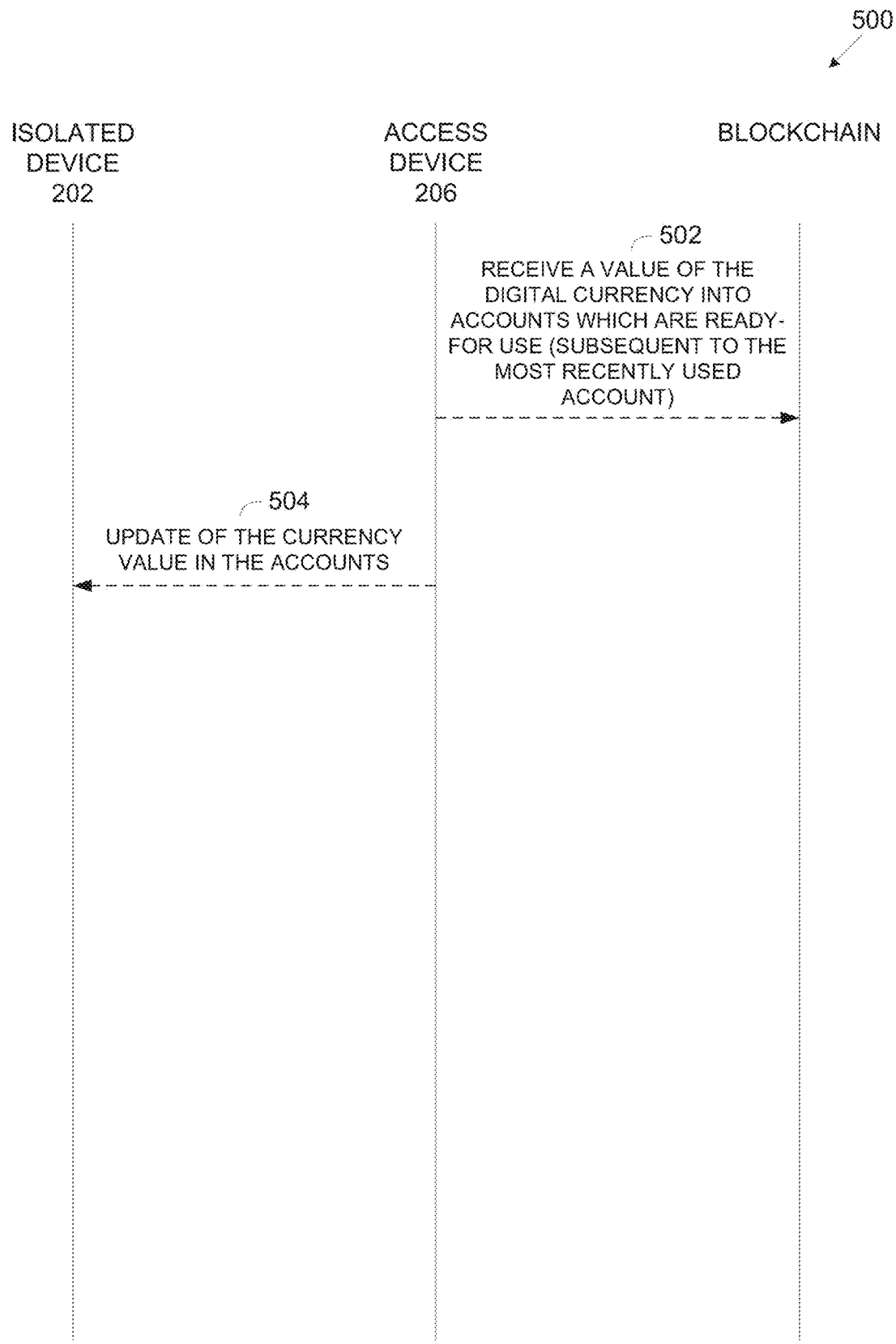
FIG. 5 is a schematic illustration of an exemplary sequence of receiving a value of digital assets using a limited connection isolated device used for storing digital assets in a plurality of limited value accounts, according to some embodiments of the present invention.

Reference is now made to FIG. 5, which is a schematic illustration of an exemplary sequence of receiving a value of digital assets using a limited connection isolated device used for storing digital assets in a plurality of limited value accounts, according to some embodiments of the present invention. An exemplary digital assets receive sequence 500 may be executed to update an isolated device such as the isolated device 202 with the information of the digital assets funds available in the limited value accounts associated with the isolated device 202. One or more receive transactions in which digital assets value is received 502 in one or more of the limited value accounts associated with the isolated device 202 may be detected, tracked and recorded (logged) in the community network, for example, in the cryptocurrency blockchain network as described in step 110 of the process 100. Updating 504 the isolated device 202 may be typically initiated by the associated user 208 and conducted as described in step 110 of the process 100.

Reference is made once again to FIG. 1.

As shown at 112, typically in response to an instruction of the associate user 208, the isolated device 202 may transfer a value of the digital assets transferred to one or more other users from one or more of the limited value accounts associated with the isolated device 202.

The isolated device 202 may transfer the value of the digital assets by transmitting, to the network community, in particular to the access device 206, the private key of one or more limited value accounts which are in the used state and cumulatively store the transferred digital assets value. In other words, the isolated device 202 transmits the private key of one or more used limited value accounts each string a limited value of the digital assets that when combined together equals (or optionally exceeds) the transferred value. Once the access device 206 has the private key of these accounts, the access device 206 (e.g. the hot wallet) may access these account(s) and retrieve the limited value of digital assets stored in these account(s) for transfer to the other user(s).

Optionally, prior to transferring the digital assets from one or more of the limited value accounts, the isolated device 202 inquiries and validates with the community network the digital assets value stored in its limited value accounts. As described herein before, the isolated device 202 may issue the inquiry(s) and validation requests to at least some of the computing nodes 204 using the validation methods described in Provisional Patent Application No. 62/775,942 titled "Secure Consensus over a Limited Connection", filed on Dec. 6, 2018, the contents of which are incorporated herein by reference in their entirety.

As described herein before in order to simplify and reduce effort for informing the isolated device 202 of which accounts are currently in the used state, the subsequent ordering of the used limited value accounts must be maintained. This means that when transferring the transferred digital assets value, the isolated device selects one or more subsequent limited value accounts which are in the used state and cumulatively store the transferred digital assets value and transmits the private key of these subsequent used account(s). In particular, the isolated device 202 transfers the transferred value from the most recently used limited value account(s), i.e. the account(s) into which a received digital assets value was stored and which hence switched (transitioned) most recently from the ready-for-use state to the used state. As such the overall digital assets funds available to the user 208 are stored in subsequent limited value accounts starting from the first account (i.e. the account having the index 0).

For example, assuming that the transferred value is available in a single most recently used account, the isolated device 202 transfers the limited value from this single most recently used account by transmitting the private key of this single most recently used account to the access device 206. In another example, assuming that the transferred value is available in three most recently used accounts, the isolated device 202 transfers the limited value from these three most recently used accounts by transmitting the private key of these three most recently used account to the access device 206.

It should be noted that this paradigm serves to further increase immunity of the limited value accounts associated with the isolated device 202. This is because in case the access device 206 (the hot wallet) is compromised by a malicious party, the most recently ("new") used accounts may be susceptible to malicious access while least recently ("old") used accounts preceding the time of compromising the access device 206 may be reliable. Therefore by releasing the digital assets funds stored in the most recently used accounts may reduce and possible prevent the ability of the malicious party to access and control accounts predating the compromising time and hence prevent theft of the digital assets funds stored in the reliable accounts.

However, since the isolated device 202 transmitted (published) the private key of the limited value account(s) from which the transferred value was transferred, these private key(s) are no longer private and may not be used for the now ready-for-use account(s).

In order to maintain the subsequent ordering of the used limited value accounts (i.e. accounts in the used state), each of the limited value accounts may be configured for multiple uses, i.e. multiple use cycles in which the limited value account transitions between the ready-for-use state and the used state. As described herein before, a limited value account which is currently in the ready-for-use state switches to the used state when at least part of a received digital assets value is stored in the account. Complementary, a limited value account which is currently in the used state switches to the ready-for-use state when the limited value stored in the account is transferred out of the account (from the isolated device 202). This is accomplished by generating a new asymmetric cryptographic key pair for each account that transitions from the used state to the read-for-use state.

The isolated device 202 may publish, to the community network, the new asymmetric cryptographic key pairs generated for each account that transitioned from the used state to the read-for-use state thus making these accounts available for receiving digital assets funds. In particular, the isolated device 202 may publish the newly generated asymmetric cryptographic key pairs by transmitting them to the access device 206 via the unidirectional secure channel.

Figure 6:
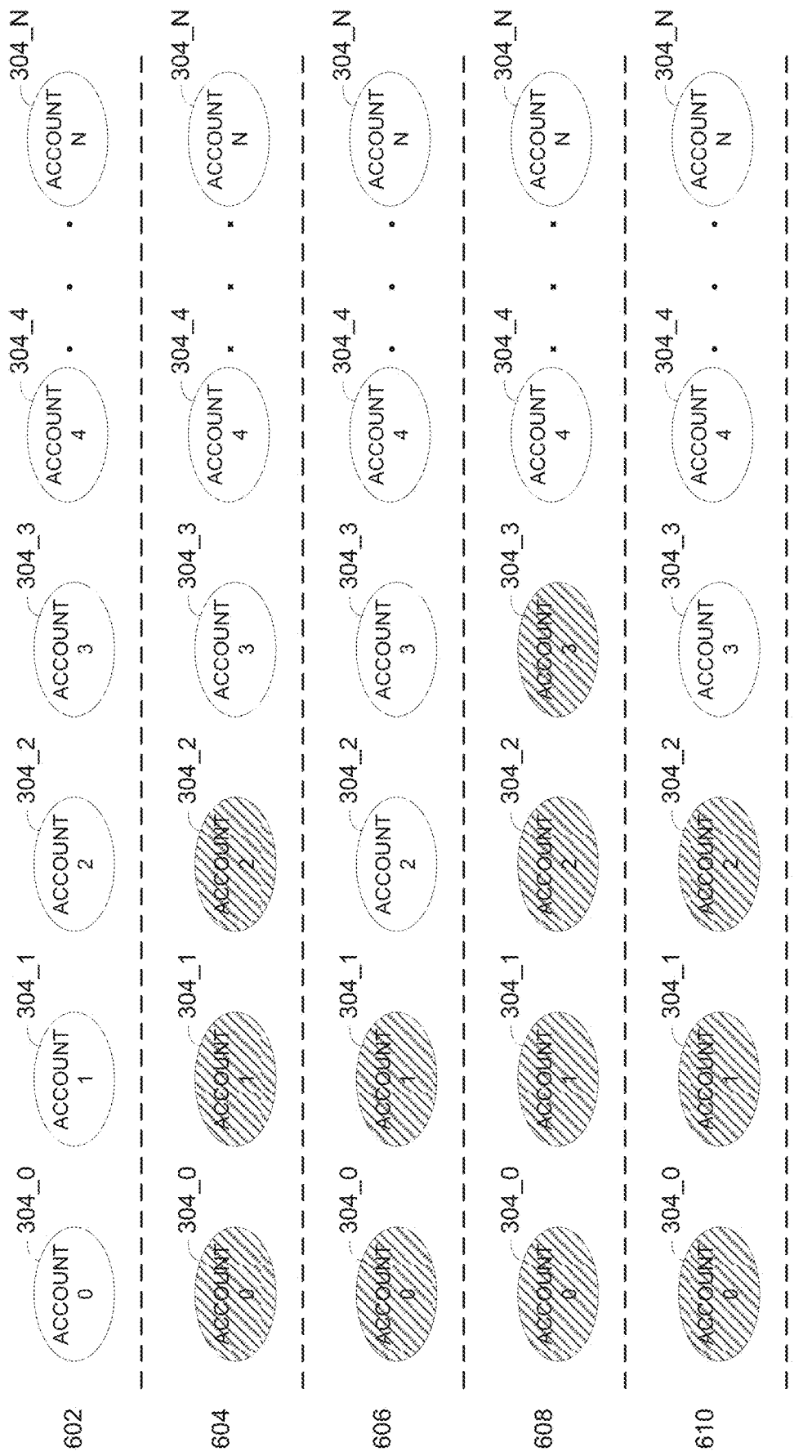
FIG. 6 is a schematic illustration of an exemplary allocation of digital assets according to a subsequent ordering in limited value accounts associated with a limited connection isolated device used for storing digital assets.

Reference is now made to FIG. 6, which is a schematic illustration of an exemplary allocation of digital assets according to a subsequent ordering in limited value accounts associated with a limited connection isolated device used for storing digital assets, according to some embodiments of the present invention. A plurality of limited value accounts such as the limited value accounts 304 may be associated with an isolated device such as the isolated device 202. The number of the limited value accounts 304 may be set according to one or more of the allocation parameters, for example, N limited value account indexed from 0 to N, account 304_0, 304_1, 304_2, 304_3, 304_4, through 304_N.

Initially, as seen at 602, all of the limited value accounts 304 may be in the ready-for-use state as they may not store digital assets funds and may hence be ready for use, i.e. ready for storing their designated limited value of the digital assets.

As seen at 604, assuming a value of the digital assets is received by the isolated device 202 (in particular received by the user 208 associated with the isolated device 202), the received digital assets value is stored in subsequent accounts 304 starting from the lowest indexed ready-for use account 304, in this example, account 304_0. Further assuming the received digital assets value is equal to the cumulative limited value set for the first three accounts 304_0, 304_1 and 304_2 which thus switch (transition) to the used state.

As seen at 606, assuming a value of the digital assets is transferred from the isolated device 202, the transferred digital assets value is transferred from subsequent accounts 304 starting from the most recently used account 304, in this example, account 304_2. Further assuming the transferred digital assets value is equal to the cumulative limited value set for the account 304_2 which thus switches to the ready-for-use state.

As seen at 608, assuming another value of the digital assets is received by the isolated device 202, the received digital assets value is stored in subsequent accounts 304 starting from the lowest indexed ready-for use account 304, in this example, account 304_2. Further assuming the received digital assets value is equal to the cumulative limited value set for the accounts 304_2 and 304_3 which thus switch to the used state.

As seen at 610, assuming another value of the digital assets is transferred from the isolated device 202, the transferred digital assets value is transferred from subsequent accounts 304 starting from the most recently used account 304, in this example, account 304_3. Further assuming the transferred digital assets value is equal to the limited value set for the account 304_3 which thus switches to the ready-for-use state.

Figure 7:
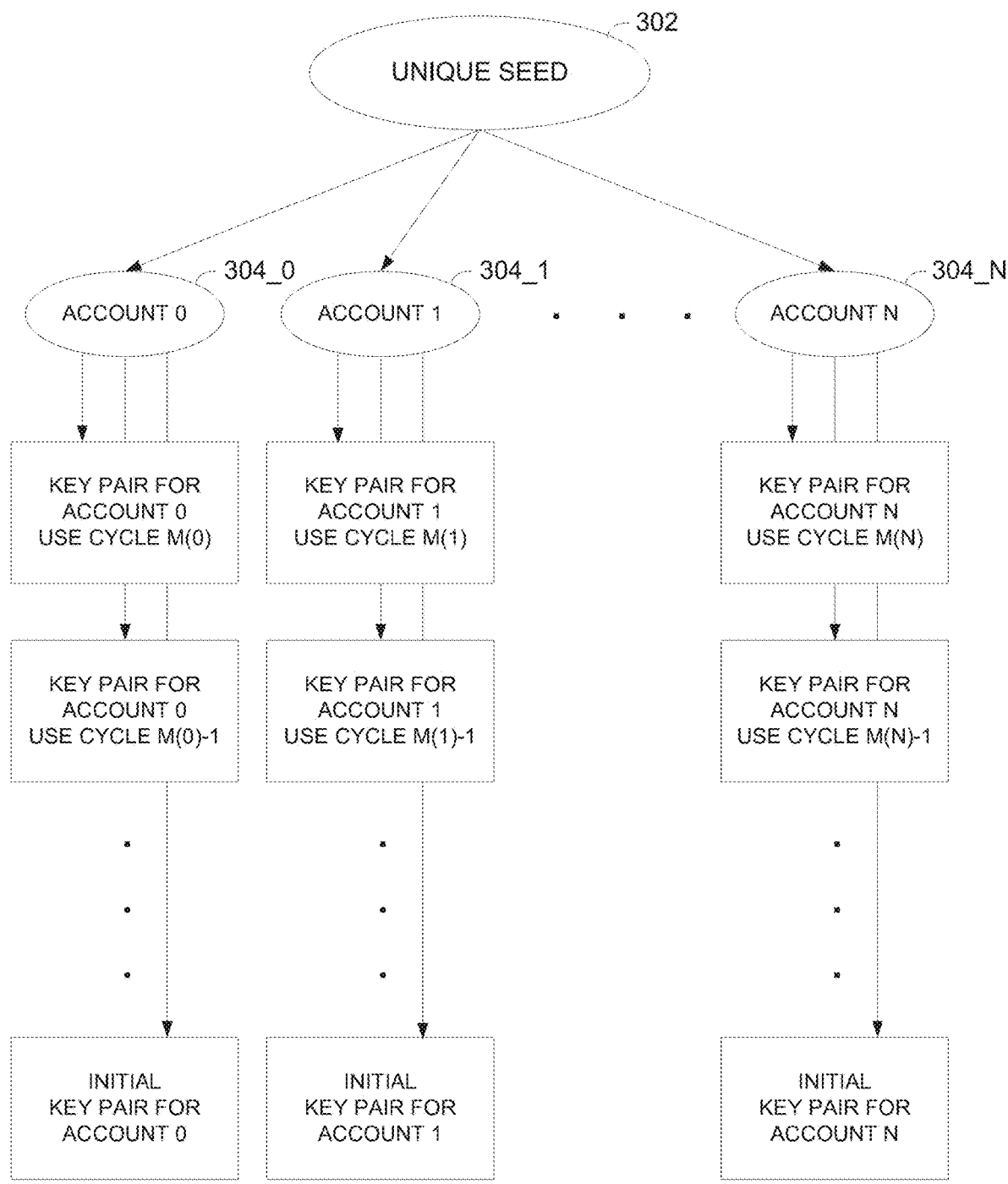
FIG. 7 is a schematic illustration of an exemplary construction of asymmetric cryptographic key pairs for reused limited value accounts associated with a limited connection isolated device used for storing digital assets, according to some embodiments of the present invention.

Reference is now made to FIG. 7, which is a schematic illustration of an exemplary construction of asymmetric cryptographic key pairs for reused limited value accounts associated with a limited connection isolated device used for storing digital assets, according to some embodiments of the present invention. As described in FIG. 3, an isolated device such as the isolated device 202 assigned with a unique seed such as the unique seed 302 may generate an asymmetric cryptographic key pair such as the asymmetric cryptographic key pair 306 for each of the limited value accounts such as the limited value accounts 304. Each of the asymmetric cryptographic key pairs 306 comprising a respective private key and a corresponding public key.

However, the isolated device 202 may generate the asymmetric cryptographic key pairs 306 not only based on the index of the account 304 but also based on the number of its previous uses, i.e. the number of use cycles during which the account 304 transitioned (switched) from the used state to the ready-for use state. As described herein before, the isolated device 202 may generate deterministically the asymmetric cryptographic key pairs 306 such that they may be reproduced using the unique seed 302, the account number and the used cycles. Again, as described for FIG. 3, the isolated device 202 may use one or more of the key derivation functions, algorithms and/or methods to generate the asymmetric cryptographic key pairs 306. For example, the isolated device 202 may compute the private key of each of the accounts 304 according to a formulation expressed in equation 2 below.

$$\text{private key} = \text{HASH}(\text{HASH}(\text{seed}, \text{account index}), \text{use cycle number}) \quad \text{Equation 2:}$$

The respective public key may derived from the private key as known in the art and may be designated as ADR (account index, use cycle number). As described herein before, for the cryptocurrency embodiments the address (ADR) may be a hash value computed for the public key using one or more of the hash functions.

As such each of the limited value accounts 304 may be associated with a plurality of asymmetric cryptographic key pairs 306, including the asymmetric cryptographic key pair initially generated for the respective account 304 and the asymmetric cryptographic key pair generated for each use cycle of the respective account 304. However, only the most recently generated asymmetric cryptographic key pair 306 is valid as it is the only asymmetric cryptographic key pair whose private key was not publicly published to the community network. The number of use cycles may vary between the limited value accounts 304 since each account 304 may be used a different number of times. For example, assuming the limited value account 304_0 (index 0) was used M(0)−1 times, i.e. went through M(0)−1 use cycles, the limited value account 304_0 may have M(0) asymmetric cryptographic key pairs 306_0 where only the asymmetric cryptographic key pair 306_0_M(0) is valid. In another example, assuming the limited value account 302_1 was used M(1) times, i.e. went through M(1)−1 use cycles, the limited value account 304_1 may have M(1) asymmetric cryptographic key pairs 306_1 where only asymmetric cryptographic key pair 306_1_M(1) is valid. In another example, assuming the limited value account 304_N was used M(N)−1 times, i.e. went through M(N)−1 use cycles, the limited value account 304_N may have M(N) asymmetric cryptographic key pairs 306_N where only asymmetric cryptographic key pair 306_N_M(N) is valid. It should be emphasized that the number of use cycles M(0), M(1) through M(N) may be different between the limited value accounts 304

Figure 8:
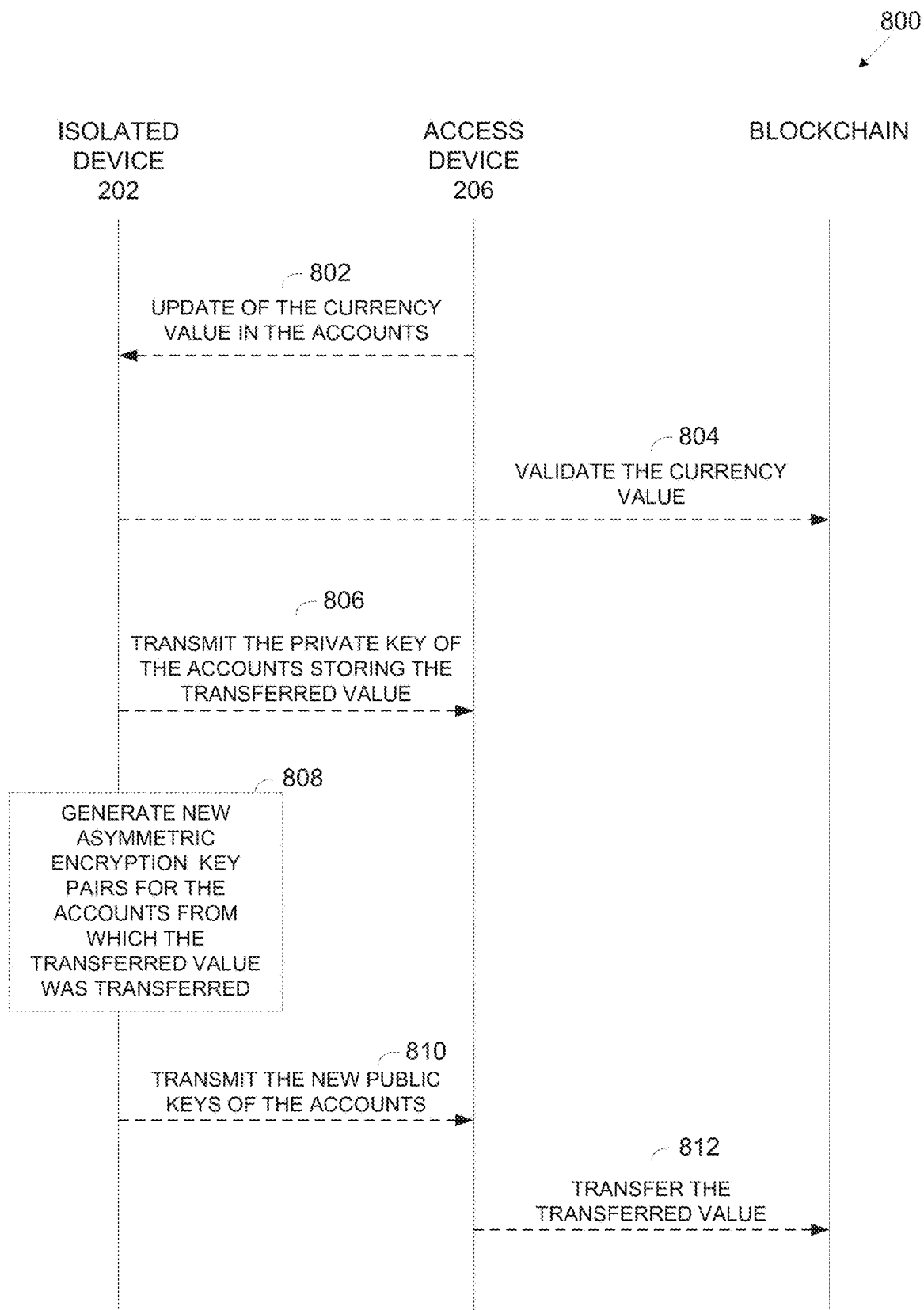
FIG. 8 is a schematic illustration of an exemplary sequence of transferring a value of digital assets using a limited connection isolated device used for storing digital assets in a plurality of limited value accounts, according to some embodiments of the present invention.

Reference is now made to FIG. 8, which is a schematic illustration of an exemplary sequence of transferring a value of digital assets using a limited connection isolated device used for storing digital assets in a plurality of limited value accounts, according to some embodiments of the present invention. An exemplary digital assets transfer sequence 800 may be executed by an isolated device such as the isolated device 202 to transfer digital assets funds stored in one of more of the limited value accounts associated with the isolated device 202. As described herein before, prior to transferring the transferred value, the isolated device 202 may be updated 802 with information relating to the overall value of digital assets funds stored in the limited value accounts associated with the isolated device 202 as described in step 110 of the process 100. Optionally, as described in step 112 of the process 100, the isolated device 202 may validate 804 the information provided to it by issuing one or more queries to the one or more computing devices 204 of the blockchain (via the access device 206) as described in Provisional Patent Application No. 62/755,942, the contents of which are incorporated herein by reference in their entirety. In order to transfer the limited digital assets value stored in one or more of the used accounts, the isolated device 202 may transfer control over this account(s) to the access device 206 by transmitting 806, to the access device 206, the private key of the account(s) from which the digital assets value is to be transferred thus releasing the limited digital assets value stored in each of these account(s). After publishing the private key of the released account(s), the isolated device 202 generates 808 a new asymmetric cryptographic key pair for each of the released account(s) which have switched from the used state to the ready-for-use state. The isolated device 202 may transmit 810, to the access device 206, the public keys of the released limited value accounts 304 which are derived from the newly generated asymmetric cryptographic key pairs. For example, in the cryptocurrency embodiment, the isolated device 202 may transmit the public keys of the limited value accounts 304 to the access device 206. The process 800 is essentially executed to transfer digital assets funds to one or more other accounts of one or more other users. The access device 206 and/or one or more of the computing nodes 204 serving as the hot wallet now have access to the digital assets funds stored in the released account(s) and may thus transfer 812 these digital assets to one or more accounts of one or more other users controlled by the community network, for example, the blockchain network. The access device 206 and/or one or more of the computing nodes 204 serving as the hot wallet may execute the digital assets transaction immediately and/or according to one or more scheduled events independently of communication with the isolated device 202 (cold wallet).

According to some embodiments of the present invention the isolated device 202 is configured to support multiple initialization processes. In particular the isolated device 202 is configured to support multiple recovery processes following a first-ever initialization process of the isolated device 202.

The first-ever initialization process may be conducted as described in the sequence 400 when the user 208 associated with the isolated device 202 first establishes his account with the community network for using the digital assets. For example, in case of the cryptographic currency, the first-ever initialization process is conducted to associate the isolated device 202 with a new account of the user 208 in the cryptocurrency blockchain.

The recovery processes are conducted following one or more failures to the isolated device 202 after which the isolated device 202 needs to be restored and re-associated with the plurality of limited value accounts created for the user 208 and which may already store digital assets funds. Due to the failure(s), while historical digital assets transactions conducted in the limited value accounts of the user 208 are tracked and logged by the community network, for example, the blockchain network, the isolated device 202 itself may not store this historical track record and the digital assets funds stored in the limited value accounts may thus not be available to the user 208.

The failures of the isolated device 202 may include for example, a memory erasure of the isolated device 202 during which the memory of the isolated device is erased and the isolated device 202 therefore does not have the historical track record locally stored. In another example, the recovery process may be conducted to initialize a new isolated device 206 replacing a previous isolated device 202 of the user 208 which is scrapped, for example, destroyed, damaged, lost and/or the like and therefore naturally does not have the historical track record locally stored.

During each initialization process, either for the first-ever initialization process as described in the sequence 300 and for each recovery process as described herein after, the isolate device 202 may generate deterministically, based on the unique seed 302, a plurality of new asymmetric cryptographic key pairs for the plurality of limited value accounts.

Moreover, since the isolated device 202 does not have the historical track record and since one or more of the limited value accounts were used during different initialization sequences, the isolated device 202 may be unaware of which of the limited value accounts are used and are storing digital assets, for example, in the cryptocurrency blockchain. Therefore in order to identify the limited value accounts which are used, i.e. store digital assets, using the unique seed 302, the isolated device 202 may reproduce the asymmetric cryptographic key pairs generated during all previous initialization processes for all use cycles of at least some of the limited value accounts. The isolated device 202 may then publish, to the community network, the public keys of at least some of the limited value accounts generated during all previous initialization processes and use cycles such that one or more of the computing nodes 204 and/or the access device 206 may use the public keys to identify which of the limited value accounts associated with the restored isolated device 202 are used, i.e. store digital assets.

The number of limited value accounts for which the isolated device 202 reproduces the asymmetric cryptographic key pairs and publishes the respective public keys may be set according to one or more implementation modes and/or paradigms. For example, the isolated device 202 may reproduce and publish the public keys of a number of limited value accounts which is sufficient for storing the maximal digital assets value, such as for example, the entire value of the digital value available on the market. In another example, the isolated device 202 may reproduce and publish the public keys of a predefined (and typically large) number of limited value accounts. One or more of the computing nodes 204 and/or the access device 206 may check in the blockchain whether the accounts whose public keys were published by the isolated device 202 are in use, i.e. store digital assets. Due to the subsequent ordering of the used accounts, the computing nodes 204 and/or the access device 206 may identify the highest indexed used account and may determine accordingly whether the isolated device 202 needs to reproduce and publish the public key for additional accounts. In case the highest indexed limited value account for which the public key was published is not used, the computing node(s) 204 and/or the access device 206 may determine that no additional accounts need to be checked in the blockchain. However, in case the highest indexed limited value account for which the public key was published is used, the computing node(s) 204 and/or the access device 206 may determine that additional higher indexed accounts may be in use. The computing node(s) 204 and/or the access device 206 may therefore request the isolated device 202 to reproduce and publish the public keys of additional limited value accounts subsequent to the previously published accounts.

Figure 9:
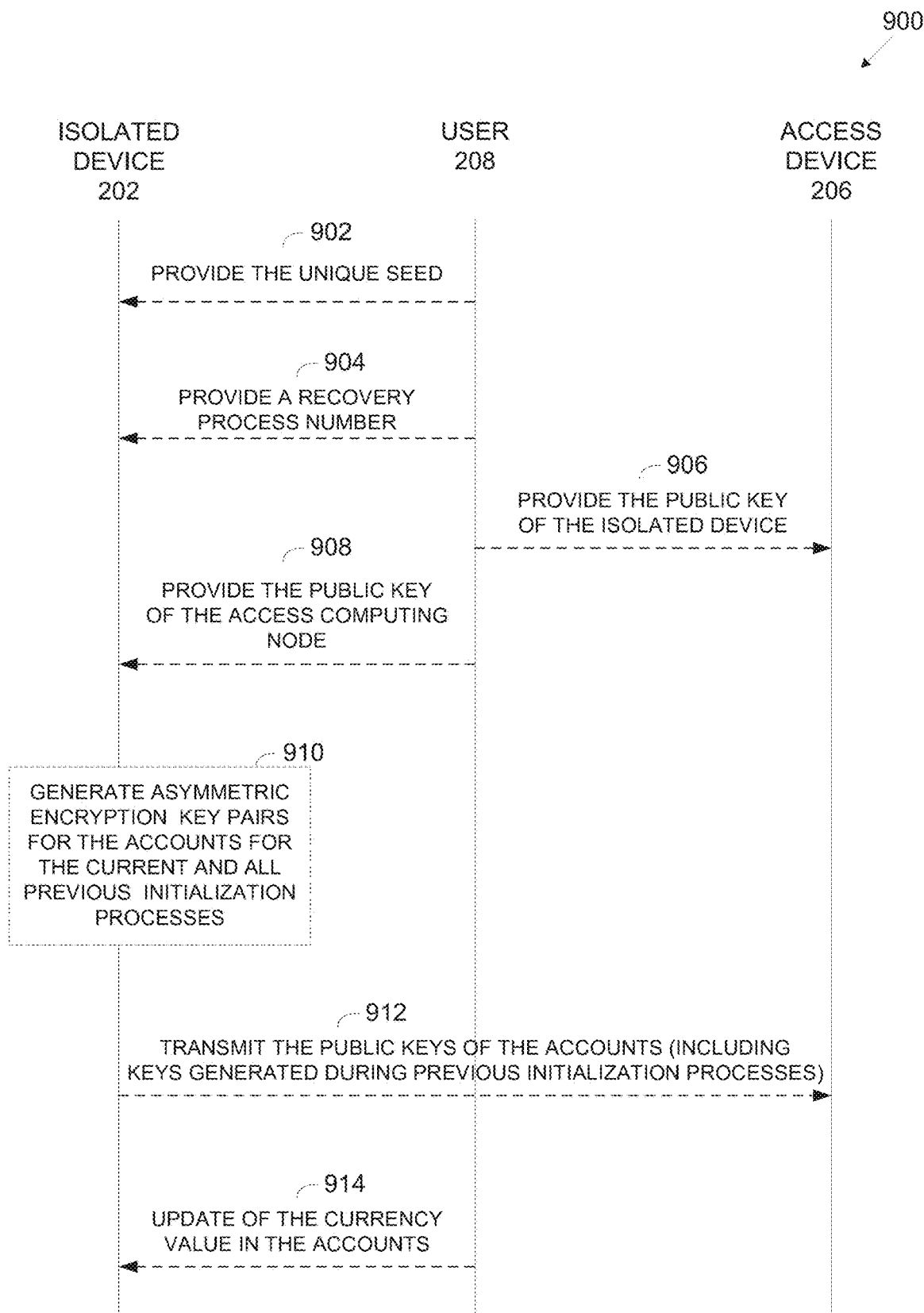
FIG. 9 is a schematic illustration of an exemplary sequence of recovering a limited connection isolated device used for storing digital assets in a plurality of limited value accounts, according to some embodiments of the present invention.

Reference is now made to FIG. 9, which is a schematic illustration of an exemplary sequence of recovering a limited connection isolated device used for storing digital assets in a plurality of limited value accounts, according to some embodiments of the present invention. An exemplary recovery sequence 900 may be executed to restore an isolated device such as the isolated device 202.

First, a user such as the user 208 associated with the isolated device 202 may provide 902 a unique seed such as the unique seed 302 to the isolated device as described in step 102 of the process 100. In particular, since the unique seed 302 was already generated in the past for the user 208, during the recovery process the user 208 may provide his unique seed 302 to the isolated device 202, for example, via the limited capacity input interface 216. For example, the user 208 may type a limited length string comprising the unique seed 302 at the limited capacity input interface 216 of the restored isolated device 202.

The user 208 may further provide (inform) 904 the isolated device 202 of the number of previous initialization processes. For example, assuming the current recovery process is the $3^{rd}$ recovery process conducted for the isolated device 206, the user 208 may indicate three initialization since there was the first-ever initialization process followed by two recovery processes. The user 208 may provide this information to the isolated device using the limited capacity input interface 216, for example, typing the limited length string via the user interface provided by the limited capacity input interface 216.

In order to support secure communication between the restored isolated device 202 and the access device 206, the user 208 may provide 906 the public key of the isolated device 202 to the access device 206 as described in the sequence 400. Similarly the user 208 may provide 908 the public key of the access device 206 to the isolated device 202 as described in the sequence 400.

Using the unique seed 302, the isolated device 202 may generate 910 deterministically new asymmetric cryptographic key pairs for at least some of the plurality of limited value accounts which are used to be used for the accounts after the current recovery process is complete.

The isolated device 202, using the unique seed 302, may further reproduce the asymmetric cryptographic key pairs generated during all previous initialization processes for at least some of the accounts. This may be easily done since during the previous initialization process the asymmetric cryptographic key pairs were deterministically generated using the unique seed 302 and are therefore reproducible using the unique seed 302.

The isolated device 202 may then publish (transmit) 912, to the community network, the public keys (from which the accounts addresses may be computed, e.g. hash value) of all accounts generated during all previous initialization processes as well as the new public keys generated during the current recovery process. Using the published public keys, one or more of the computing nodes 204 and/or the access device 206 may inquire the community network, for example, the blockchain to identify which of the limited value accounts associated with the restored isolated device 202 are used, i.e. store digital assets.

In some embodiments, the isolated device 202 reproduces and publishes the asymmetric cryptographic key pairs of all accounts for all previous initialization processes. However, the isolated device 202 may reproduce and publish the asymmetric cryptographic key pairs generated for a subset of the accounts during all previous initialization processes. In case it is needed, the user 208 in response to a request from the access device 206 may instruct the isolated device to reproduce the asymmetric cryptographic key pairs generated for additional and/or all accounts during all previous initialization processes.

The access device 206 may then compute a limited length string identifying the limited value accounts in which digital assets is stored. Since the isolated device 202 and the access device 206 employ the subsequent ordering scheme for transferring and receiving digital assets funds from and to the limited value accounts, the accounts which store digital assets are ordered in sequence starting from the lowest indexed account, for example, the account indexed 0

(304_0). The access device 206 may therefore simply compute a limited length string indicating the overall digital assets funds stored in all the accounts associated with the isolated device 202.

The user 208 may update 914 the isolated device 202 with the overall digital assets funds stored in the limited value accounts associated with the restored isolated device 202 by providing to the isolated device 202, via the limited capacity input interface 216, the respective limited length string computed by the access device 206. The isolated device 202 may extract the value of the overall digital assets funds stored in the limited value accounts associated with the restored isolated device 202. Due to the subsequent ordering of the used accounts, based on the overall digital assets funds extracted from the limited length string, the isolated device 202 may easily determine which of the accounts is used according to the indicated overall digital assets funds and the limited value each account may store.

After the isolated device 202 is updated and determines which of the limited value accounts stores its limited value (i.e. in the used state), the isolated device 202 may still be unaware of during which of the initialization processes one or more of the accounts transitioned the used state, i.e. during which initialization process at least part of a received value was stored in the account(s).

When requested to transfer a certain value of the digital assets, the isolated device 202 may publish the private key generated during all initialization processes for one or more of the accounts 304 storing cumulatively digital assets which equals the transferred value. In particular, in order to maintain the subsequent ordering, the isolated device 202 publishes the private key of one or more accounts 304 which were most recently loaded with received digital assets, i.e. accounts which most recently transitioned from the ready-for-use state to the used state.

Figure 10:
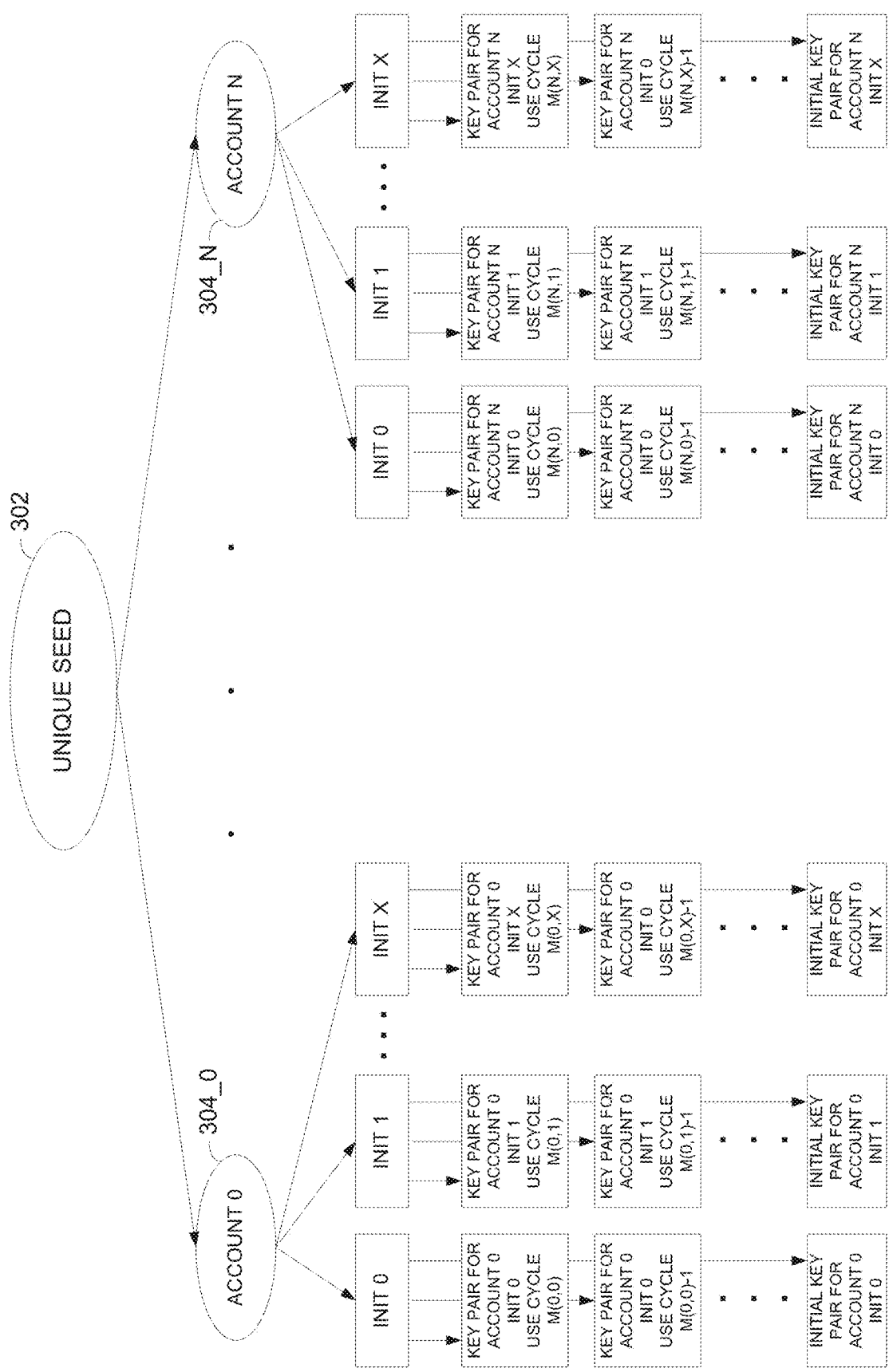
FIG. 10 is a schematic illustration of a first exemplary construction of asymmetric cryptographic key pairs for a recovered limited connection isolated device used for storing digital assets, according to some embodiments of the present invention.

Reference is now made to FIG. 10, which is a schematic illustration of a first exemplary construction of asymmetric cryptographic key pairs for a recovered limited connection isolated device used for storing digital assets, according to some embodiments of the present invention. As described in FIG. 3 and FIG. 7, an isolated device such as the isolated device 202 assigned with a unique seed such as the unique seed 302 may generate, based on the unique seed 302, an asymmetric cryptographic key pair such as the asymmetric cryptographic key pair 306 for each of the plurality of limited value accounts 304. As described herein before, the isolated device 202 may generate the asymmetric cryptographic key pairs 306 comprising the unique private key and the corresponding public key for each of the limited value accounts 304 based on the seed 302, the index of the account 304 and the number of used cycles.

However, the isolated device 202 may generate the asymmetric cryptographic key pairs 306 not only based on the index of the account 304 and the number of use cycles but also based on the number initialization processes. The isolated device 202 may therefore generate deterministically the asymmetric cryptographic key pairs 306 based on the unique seed 302, the indexes of the accounts 304, the number of use cycles of the accounts 304 and the number of initialization processes. As such the asymmetric cryptographic key pairs 306 may be deterministically reproduced given the unique seed 302. Again, as described for FIG. 3 and FIG. 7, the isolated device 202 may use one or more of the key derivation functions, algorithms and/or methods to generate the asymmetric cryptographic key pairs 306. For example, the isolated device 202 may compute the private key of each of the accounts 304 using one or more of the hash functions according to equation 3 below.

$$\text{private key=HASH(HASH(HASH(seed,account index),use cycle number),initialization number).} \quad \text{Equation 3:}$$

The respective public key may derived from the private key may be computed as: ADR(account index, use cycle number, initialization number).

Alternatively, the isolated device 202 may compute the private key of each of the accounts using the hash function(s) according to equation 4 below.

$$\text{private key=HASH(HASH(HASH(seed,account index),initialization number),use cycle number).} \quad \text{Equation 4:}$$

Complementary, the respective public key may derived from the private may be computed as: ADR(account index, initialization number, use cycle number).

As such each of the limited value accounts 304 may be associated with a plurality of asymmetric cryptographic key pairs 306 which include the asymmetric cryptographic key pair initially generated for the respective account and the asymmetric cryptographic key pair generated for each use cycle of the respective account. Moreover, each of the limited value accounts may be associated with a plurality of asymmetric cryptographic key pairs generated for each of the initialization processes.

Therefore, assuming the isolated device 202 has undergone X initialization processes. Further assuming that during the period following each initialization process one or more of the limited value accounts 304 may have been used multiple times, i.e. multiple use cycles. Each account 304 may therefore be associated with a tree of asymmetric cryptographic key pairs 306 where each branch corresponds to a respective initialization process (1 through X) and each level in the branch corresponds to a respective use cycle. For example, assuming the account 304_0 was used M(0,0) times (M(0,0) use cycles) during the period following the first (ever) initialization process, the branch of account 304_0 for initialization process 0 includes M(0,0)+1 asymmetric cryptographic key pairs 306. Assuming the account 304_0 was used M(0,1) times (M(0,1) use cycles) during the period following the second initialization process (i.e. the first recovery process), the branch of account 304_0 for initialization process 1 includes M(0,1)+1 asymmetric cryptographic key pairs 306. Similarly, assuming the account 304_0 was used M(0,X) times (M(0,X) use cycles) during the period following the initialization process X, the branch of account 304_0 for initialization process X includes M(0, X)+1 asymmetric cryptographic key pairs 306.

The isolated device 202 may apply the same construction for the other limited value accounts 304 associated with isolated device 202. For example, assuming the account 304_N was used M(N,0) times (M(N,0) use cycles) during the period following the first (ever) initialization process, the branch of account 304_N for initialization process 0 includes M(N,0)+1 asymmetric cryptographic key pairs 306. Assuming the account 304_N was used M(N,1) times (M(N, 1) use cycles) during the period following the second initialization process (i.e. the first recovery process), the branch of account 304_N for initialization process 1 includes M(N,1)+1 asymmetric cryptographic key pairs 306. Similarly, assuming the account 304_N was used M(N,X) times (M(N,X) use cycles) during the period following the initialization process X, the branch of account N for initialization process X includes M(N,X)+1 asymmetric cryptographic key pairs 306.

As described herein before, when requested to transfer a certain value of the digital assets, the isolated device 202 may publish the private key generated during all initialization processes for all use cycles for one or more accounts 304 which most recently transitioned to the used state and which store cumulatively the transferred value. Due to the subsequent ordering scheme, multiple accounts of the limited value accounts 304 may be used multiple times, i.e. transition multiple times between the ready-for-use state and the used state. This may result in a plurality of asymmetric cryptographic key pairs 306 generated for these highly used accounts 304 thus resulting in a large number of private keys that the isolated device 202 has to transmit in order to release the digital assets funds in these account(s) 304. The number of asymmetric cryptographic key pairs 306 and hence the number of private key is further increased in case of multiple initialization processes.

In order to reduce the number of private keys that need to be transmitted and published by the isolated device 202, the asymmetric cryptographic key pairs 306 generated during each initialization process may be generated deterministically based on derivation from adjacent initialization process(es). As such a common key value may be transmitted by the isolated device to the community network, in particular to the access device 206 which using the common key value may reproduce deterministically the private keys generated for the account(s) during all previous initialization processes.

Figure 11:
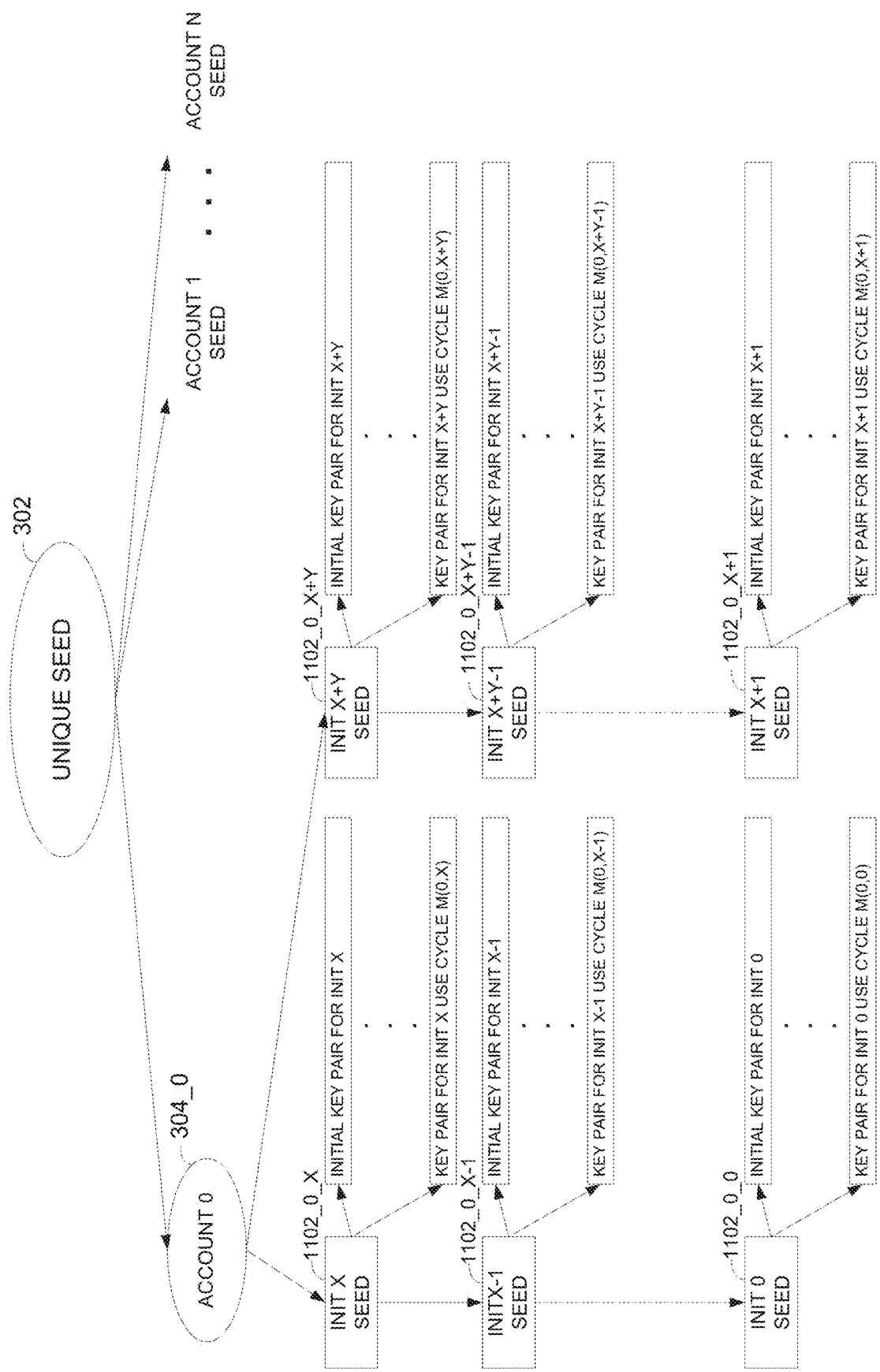
FIG. 11 is a schematic illustration of a second exemplary construction of asymmetric cryptographic key pairs for a recovered limited connection isolated device used for storing digital assets, according to some embodiments of the present invention.

Reference is now made to FIG. 11, which is a schematic illustration of a second exemplary construction of asymmetric cryptographic key pairs for a recovered limited connection isolated device used for storing digital assets, according to some embodiments of the present invention. The following is described for a single limited value account such as the limited value account 304 associated with an isolated device such as the isolated device 202, however it applies to any of the other limited value accounts associated with the isolated device 202, for example, the accounts 304_0 through 304_N.

As described in FIG. 10, the isolated device 202 assigned with a unique seed such as the unique seed 302 may generate, based on the unique seed 302, an asymmetric cryptographic key pair such as the asymmetric cryptographic key pair 306 for each of the plurality of limited value accounts 304. However, as opposed to the exemplary construction described in FIG. 10, the construction of asymmetric cryptographic key pairs 306 in FIG. 11 is done by generating the asymmetric cryptographic key pairs 306 for all limited value accounts for all use cycles based on an initialization seed 1102 computed for each initialization processes as a one-way derivation from the initialization seed 1102 of a succeeding initialization process. The asymmetric cryptographic key pair 306 generated for by the isolated device 202 for each limited value account (1 to N) following each use cycle is derived from the initialization seed 1102 computed for the currently applied initialization process. This may allow the isolated device 202, following a certain initialization process, to publish the initialization seed 1102 of the previous initialization process thus allowing the computing nodes 204 to reproduce the private keys of the account 304 without compromising (revealing) the private key that will be generated for the account 304 during a successive initialization process. This is because due to the one-way derivation (e.g. hash function), given the initialization seed 1102 of a certain initialization process, the computing node(s) 204 and/or the access device 206 may compute the initialization seeds 1102 of all initialization processes preceding the certain initialization process but unable to compute the initialization seed 1102 of initialization processes succeeding the certain (most recent) initialization process. The computing node(s) 204 and/or the access device 206 are therefore unable to reproduce the private key of the account 304 which will be generated and valid during future initialization processes.

For example, the isolated device 202 may compute in advance an initialization seed 1102_0_X for the limited value account 0 for the initialization process X. The isolated device 202 may then compute a plurality of initialization seeds 1102_0 for the limited value account 0 for all initialization process preceding the initialization process X as deterministic derivations from the initialization seed 1102_. For example, the isolated device 202 may compute for the limited value account 0 an initialization seed 1102_0_X-1 (for initialization process X-1) from the initialization seed 1102_0_X, an initialization seed 1102_0_X-2 (for initialization process X-2) from the initialization seed 1102_0_X-1 and so on to an initialization seed 1102_0_0 (for initialization process 0). The asymmetric cryptographic key pairs 306 generated for the limited value account 0 for each use cycle are derived from the initialization seed 1102_0 of the currently applied initialization process. The isolated device 202 may apply the same may for at least some of the other limited value accounts 1 through N. For example, the isolated device 202 may compute an initialization seed 1102_1_X for the limited value account 1 for the initialization process X from which a plurality of initialization seeds 1102_1 may be computed for the limited value account N for all initialization processes preceding the initialization process X. In another example, the isolated device 202 may compute an initialization seed 1102_N_X for the limited value account N for the initialization process X from which a plurality of initialization seeds 1102_N may be computed for the limited value account N for all initialization processes preceding the initialization process X.

According to this construction which is shared and known by the isolated device 202 and the computing nodes 204 and/or at least the access device 206, when transferring the limited value from one or more of the accounts 304, in order to publish the private key of these account(s) 204, the isolated device 202 may only transmit the initialization seed 1102 of the most recent initialization process. This may naturally be done for used limited value accounts in which digital assets was stored during previous initialization processes. This may not be required for limited value accounts in which digital assets was stored during the current initialization process since the isolated device 202 is familiar with such account(s). Using the initialization seed 1102 of the most recent initialization process, the computing nodes 204 and/or the access device 206 may deterministically generate the private key of the released account(s) 204 for the current and all previous initialization processes and thus gain access to the digital assets funds stored in these released account(s) 204. However, due to the one-way derivation the private keys that will be generated for these account(s) during future initialization processes are not compromised since they may not be derived from the previously published initialization seed(s) 1102.

Since the isolated device 202 computes the initialization seeds 1102 in advance, the number X of initialization seeds 1102 is predefined. However, in case the need arises, for example, the number of initialization processes exceeds the predefined number X, the isolated device 202 may compute another initialization seed 1102_X+Y. The isolated device 202 may then compute a plurality of initialization seeds 1102 for all initialization process preceding the initialization process X+Y (and preceding the initialization process X) as deterministic derivations from the initialization seed $1102\_X+Y$. For example, the isolated device 202 may compute an initialization seed $1102\_X+Y-1$ (for initialization process $X+Y-1$) from the initialization seed $1102\_X+Y$, an initialization seed $1102\_X+Y-2$ (for initialization process $X+Y-2$) from the initialization seed $1102\_X+Y-1$ and so on to an initialization seed $1102\_X+1$ (for initialization process $X+1$).

In another exemplary embodiment, the asymmetric cryptographic key pairs 306 generated during each initialization process may be generated deterministically based on derivation from the initialization seed 1102 computed for the respective initialization process.

During the first-ever initialization process, the isolated device 202 may compute the initialization seed $1102\_0$ for the first initialization process. Moreover, during the first-ever initialization process, the isolated device 202 may publish (transmit) a decryption key of an asymmetric encryption-decryption key pair (e.g. RSA). During the second initialization process, the isolated device 202 may compute the initialization seed $1102\_1$ for the second initialization process and may encrypt the first initialization seed $1102\_0$ using an encryption key generated based on the second initialization seed $1102\_1$. During the third initialization process, the isolated device 202 may compute the initialization seed $1102\_2$ for the third initialization process and may encrypt the first initialization seed $1102\_1$ using an encryption key generated based on the third initialization seed $1102\_2$. As done during the first-ever initialization process, during each of the initialization processes, the isolated device 202 publishes the decryption key.

The isolated device 202 may repeat this procedure for each initialization process. When a value of the digital assets is transferred from a certain account 304, the isolated device 202 may publish the private key of the certain account 304 by publishing the initialization seed 1102 computed for the certain account 304 in the most recent initialization process. One or more of the computing nodes 204 and/or the access device 206, using the decryption key, may then decrypt the initialization seeds 1102 of all previous initialization processes.

According to some embodiments of the present invention, the isolated device 202 may create a backup of status information relating to the plurality of limited value accounts 304 associated with the isolated device 202. The status information may include, for example, an overall value of digital assets stored in the plurality of accounts 304, a number of initialization processes conducted for the isolated device 202 and/or the like. Moreover, in order to reduce effort for loading the backup into the isolate device 202 during a recovery process, the isolated device 202 may compute a backup value which may include a limited length string encoding the status information. The isolated device 202 may apply one or more functions, algorithms and/or methods to produce the backup value, for example, the isolated device 202 may use one or more hash functions to compute a hash value for the status information.

The isolated device 202 may compute the backup value(s) according to one or more backup rules, for example, periodically, upon instruction (by the user 208) and/or the like. The backup value(s) computed by the isolated device 202 may be stored in one or more storage locations to which the user 208 has access. For example, the isolated device 202 may present the computed backup value(s) on a display of the isolated device 202 such that the user 208 may copy it and store is as a hard copy. In another example, the isolated device 202 may transmit the backup value(s) via the network 230 for storage in one or more remote locations, for example, a blockchain, a storage server and/or the like. In another example, the isolated device 202 may store the backup value(s) in an attachable storage medium such as, for example, a storage media device (stick) attachable to the isolated device 202.

As described herein before, during an initialization process, in particular a recovery process, status information may be inserted into the isolated device 202 via the limited capacity input interface 216. The provided status information may include the overall value of digital assets stored in the plurality of accounts 304 associated with the isolated device 202, a number of initialization processes conducted for the isolated device 202 and/or the like.

In order to verify the status information provided during the initialization process, the backup value, in particular, the most recent backup value may be also provided to the isolated device, for example, as a limited length string inserted via the limited capacity input interface 216. The isolated device may then apply the same functions, algorithms and/or methods used to compute the backup value in order to compute an encoding value for the provided status information. Based on comparison between the computed encoding value and the backup value the isolated device 202 may validate the provided status information or alternatively detect that the provided status information is false, unreliable and/or out of date. The isolated device 202 may further present an outcome of the comparison and/or the validation via the display of the isolated device 202.

In order to ensure the backup value(s) are valid and are were not tampered, altered and/or manipulated after produced by the isolated device 202, the isolated device 202 may compute the backup value(s) based on the unique seed 302 assigned to the isolated device 202. For example, the isolated device 202 may compute the backup value by computing the hash based on the unique seed 302. As such the backup value may not be forged, altered and/or manipulated by other typically parties which do not have access to the unique seed 302 of the isolated device 202.

In order to further increase reliability and validity of the backup value(s), the isolated device 202 may further compute the backup value(s) based on the current time and/or date. As such, during the initialization (recovery) process the isolated device 202 may further determine the time and/or date of creation of the backup value and hence to which time and/or date the encoded status information pertains. The isolated device 202 and/or the user 208 associated with the isolated device 202 may therefore, based on the time and/or date provided during the initialization process, determine and validate whether the provided backup value is relevant, valid and/or reflective of the most current status information.

Optionally, during one or more of the initialization processes, the isolated device 202 validates with at least some of the computing nodes 204 at least some of the status information reported by the access device 206. The isolated device 202 validate may validate the status information and/or part thereof using the validation methods described in Provisional Patent Application No. 62/775,942 titled "Secure Consensus over a Limited Connection", filed on Dec. 6, 2018, the contents of which are incorporated herein by reference in their entirety.

Figure 12:
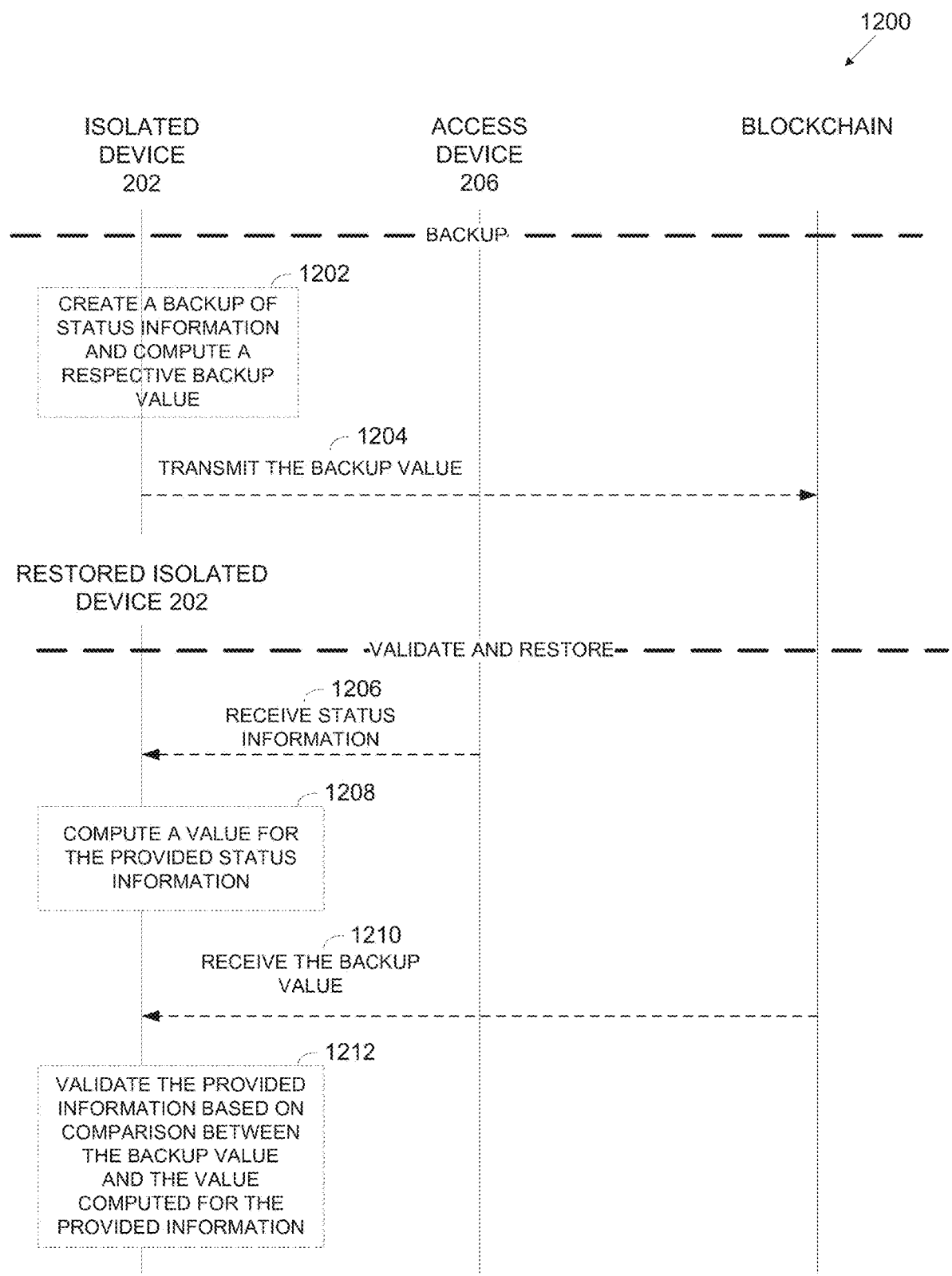
FIG. 12 is a schematic illustration of an exemplary sequence of creating a backup of a limited connection isolated device used for storing digital assets in a plurality of limited value accounts and using the backup to verify a recovery process, according to some embodiments of the present invention.
Figure 13:
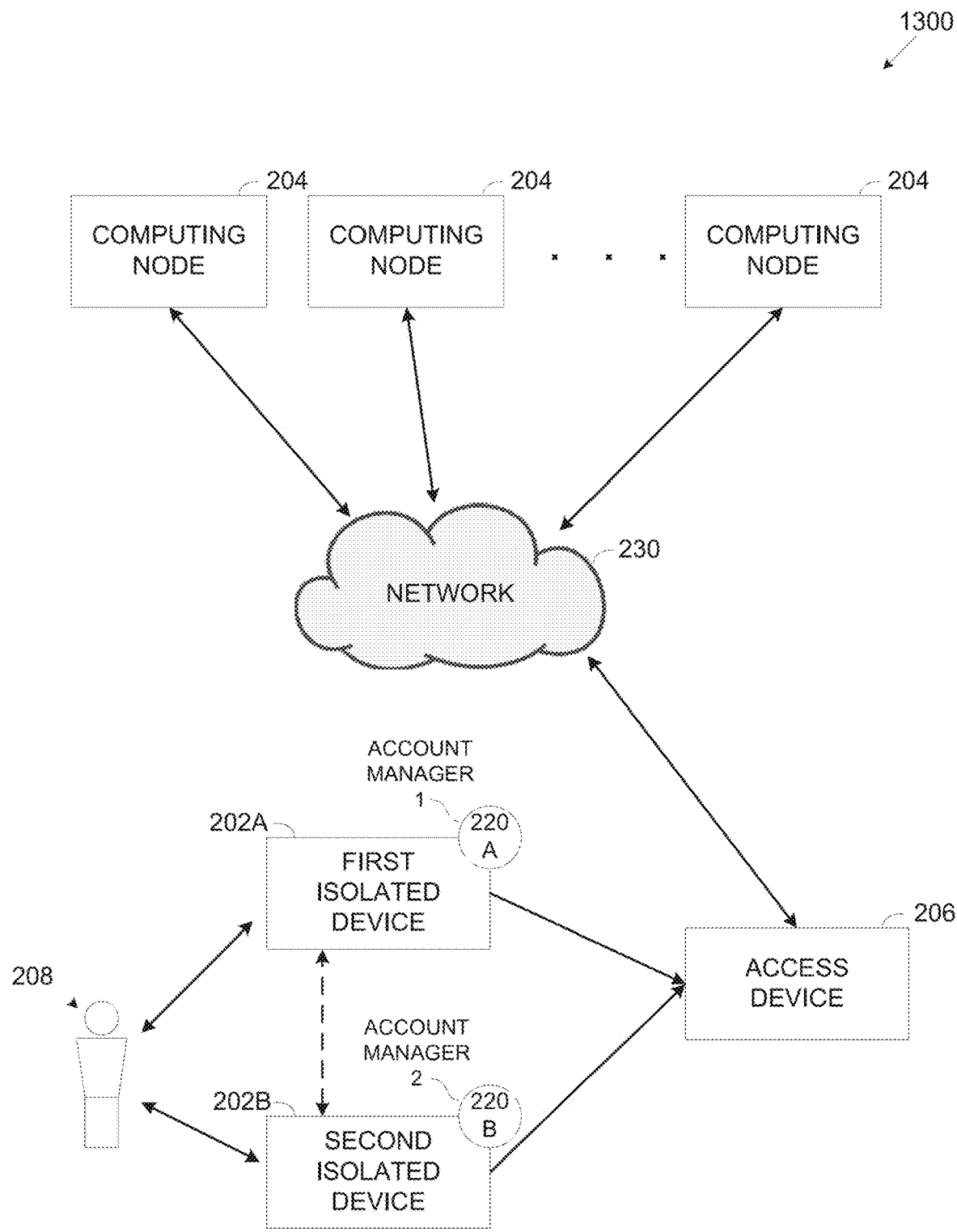
FIG. 13 is a schematic illustration of an exemplary system comprising two limited connection isolated device associated with a plurality of limited value accounts for storing digital assets, according to some embodiments of the present invention.

Reference is now made to FIG. 12, which is a schematic illustration of an exemplary sequence of creating a backup of a limited connection isolated device used for storing digital assets in a plurality of limited value accounts and using the backup to verify a recovery process, according to some embodiments of the present invention. An exemplary backup and restore sequence 1200 may be executed by an isolated device such as the isolated device 202 to create one or more backup values and use them during initialization (recovery) processes to validate status information provided to the isolated device 202.

During a backup phase, the isolated device 202 may create 1202 a backup for the status information reflecting the limited value accounts, the stored digital assets value, the number of initialization processes and/or the like as currently identified by the isolated device 202. The isolated device 202 may further compute a respective backup value for the status information backup, for example, the hash value.

The isolated device 202 may then output the computed backup value, for example, transmit 1204 the backup value via the network 230 for storage in one or more blockchains.

A validate and restore phase may be conducted to restore the isolated device 202 associated with the user 208 after the isolated device 202 fails, for example, experiences a memory erasure, scrapped and replaced with a new isolated device 202 and/or the like. During the validate and restore phase conducted by the restored isolated device 202 during an initialization (recovery) process, the restored isolated device 202 may receive 1206 status information relating to the limited value accounts associated with the isolated device 202, specifically associated with the user 208. The status information may be collected by one or more of the computing nodes 204 and/or the access device 206 inspecting, querying and/or monitoring the blockchain. The access device 206 may produce one or more limited length string encoding the collected status information. The limited length string(s) may be inserted (by the user 208) via the limited capacity input interface 216.

The restored isolated device 202 may compute 1208 an encoding value for the status information provided in step 1206. In particular, the restored isolated device 202 computes the encoding value using the functions, algorithms and/or methods used to create the backup value(s).

The restored isolated device 202 may further receive 1210 the backup value previously computed and stored in the blockchain during one or more backup processes.

The restored isolated device 202 may validate 1212 the provided status information based on a comparison between the encoding value computed for the provided status information and the backup value computed in the past, during one or more of the backup processes.

As described herein before, additionally and/or alternatively to storage in the blockchain, one or more of the backup values representing the status information of the limited value accounts may be stored in one or more alternative locations, for example, a hard copy, an attachable storage medium and/or the like. In such cases, the restored isolated device 202 may receive the backup value(s) from the respective source. For example, in case of a hard copy, the user 208 may insert to the restored isolated device 202 backup value(s) recorded in the hard copy. In another example, the restored isolated device 202 may retrieve backup value(s) stored in the attachable storage medium attached to the restored isolated device 202.

As described herein before, according to some embodiments of the present invention, the isolated device 202 may communicate with a plurality of computing nodes of the community network such as the computing nodes 204 rather than with a single device (computing node) such as the access device 206. In particular, the isolated device 202 used as cold wallet may communicate via the unidirectional secure channel with a group of the computing node 204 constituting the community network, for example, the blockchain network regulating (maintaining) the blockchain. As such, the group of the computing node 204 may serve as hot wallets. Such deployments may significantly increase security of digital assets transactions since it may be significantly more difficult for a malicious party to compromise and gain control over a plurality of computing nodes 204.

To facilitate such deployments, the isolated device 202 naturally has to be provided with the public key of the computing nodes 204 of the group in order to transmit messages to these computing nodes 204. Complementary, the group of computing nodes 204 is provided with the public key of the isolated device 202 in order to support authentication of messages received from the isolated device 202.

Optionally, the public key associated with at least some of the computing nodes 204 of the group is made available to the isolated device 202 using one or more trusted controllers as described in Provisional Patent Application No. 62/775,942 titled "Secure Consensus over a Limited Connection", filed on Dec. 6, 2018, the contents of which are incorporated herein by reference in their entirety.

As described herein before, in order to transfer a value of the digital assets to one or more accounts of one or more other users, the isolated device 202 publishes the private key of one or more limited value accounts 304 which cumulatively store the transferred value thus releasing the digital assets stored in these accounts 304.

However, since the isolated device 202 communicates with multiple computing nodes 204 (the group) in order to maintain the increased security it is essential that no one computing node 204 of the group will receive the complete private key of the released limited value account(s) 304. In such case the private key of the released limited value account(s) 304 is transmitted as a plurality of key components each transmitted to a respective one of the computing nodes 204 of the group. As such none of the computing nodes 204 of the group individually has the complete private key and/or the complete initialization seed of the released account 304 and is therefore unable to exclusively gain control over the released account 304.

Only an aggregation of the key components transmitted to at least a subset of the group of computing nodes 204 may yield the complete private key of the released account 304 and/or the complete initialization seed from which the private key of the released account 304 may be derived. The computing nodes 204 which are members of the subset, the minimal number of computing nodes 204 in the subset and/or the significance (weight) of each computing nodes 204 in the subset may be predefined.

Aggregation of the key components may be done by at least the subset of computing nodes 204 according to one or more algorithms, protocols and/or techniques for Multi-Party Computation (MPC). For example, the isolated device 202 may divide the private key and/or the initialization seed 1102 of each released account 304 to the plurality of key components which are each transmitted to a respective one of the computing nodes 204 of the group. Using their respective key components, the subset of computing nodes 204 may engage in an MPC and negotiate with each other to create a valid signature of the private key of the released account 304 and gain control of the digital assets funds stored in the released account 304. In another example, one or more threshold encryption algorithms and/or threshold signature algorithms such as, for example, multisig (multi-signature) and/or the like may be applied by the at least the subset of computing nodes 204 to aggregate their respective key components in order to jointly sign using the complete private key of each released account 304.

According to some embodiments of the present invention the user 208 is associated with another isolated device such as the isolated device 202. Control over at least some of the used limited value accounts 304 (accounts which are in the used state) and hence control over the digital assets stored in these accounts 304 is transferable between the first isolated device 202 designed herein after isolated device 202A and the second isolated device 202 designed herein after isolated device 202B.

Communication between the first isolated device 202A and the second isolated device 202B may be done by the user 208 serving as an intermediator by operating the limited capacity input interface 216 of the first isolated device 202A and the second isolated device 202B to transfer one or more limited length strings between them. This communication conducted by the user 208 is therefore assumed to be reliable and trusted.

The first isolated device 202A may be used as a cold wallet for the digital assets in particular the cryptocurrency as described herein before while the second isolated device 202B may be used as a very cold wallet. Both the first isolated device 202A and the second isolated device 202B are associated with the plurality of limited value accounts 304 of the user 208.

The second isolated device 202B (very cold wallet) may be kept in a highly secure location, for example, a vault and/or the like and may be updated on occasion to transfer control over one or more limited value accounts 304 between the second isolated device 202B and the first isolated device 202A. Specifically, control over the "oldest" used accounts 304, i.e. the least recently used accounts 304 in which digital assets was received may be transferred from the first isolated device 202A (cold wallet) to the second isolated device 202B (very cold wallet). These "oldest" accounts 304 may be reliable with highly probability as they may predate possible malicious intervention in the access device 206 and/or one or more computing nodes 204 with which the isolated device 202A communicates. Therefore, even if one of the isolated devices 202, specifically the first isolated device 202A are compromised, for example, hacked and/or stolen by a malicious party, the accounts which are under control of the second isolated device 202B may not be accessible to the malicious party. Complementary, when control over one or more accounts is transferred from the second isolated device 202B to the first isolated device 202A, these transferred accounts are the "newest" accounts controlled by the second isolated device 202B, i.e. the most recently used accounts 304 in which digital assets was received.

For example, after accumulating a certain value of the cryptocurrency in the first isolated device 202A (cold wallet) in a plurality of used accounts 304, the user 208 may transfer control over at least some of the used accounts 304 from the first isolated device 202A to the second isolated device 202B. Since the second isolated device 202B is kept in a significantly more secure location with very limited access, the accounts 304 controlled by the second isolated device 202B may be significantly less accessible and hence more secure. In another example, assuming a certain value of the cryptocurrency is accumulated in the second isolated device 202B in a plurality of used accounts 304, the user 208 who may need to make a transfer of cryptocurrency funds to one or more other accounts of other user(s) may transfer control over at least some of the used accounts 304 from the second isolated device 202B to the first isolated device 202A.

Each of the first isolated device 202A and the second isolated device 202B stores a partial seed of the unique seed 302 assigned to the user 208 such that none of the two isolated devices 202 has the complete unique seed 302. The complete unique seed 302 may be stored in a backup, for example, a hard copy kept by the user 208 and/or the like.

Control over a certain used account 304 is transferred between the first isolated device 202A and the second isolated device 202B by publishing to each other partial data values each associated with a respective one of the plurality of limited value accounts 304. The partial data values associated with a certain account 304 may be used by the receiving isolated device 202 to derive the asymmetric cryptographic key pair of the certain account and thus reproduce the private key of the certain account 304 and access the limited value of digital assets stored in the certain used account 304.

The partial data values exchanged between the first isolated device 202A and the second isolated device 202B may be derived from the partial seeds assigned to each of the first isolated device 202A and the second isolated device 202B. As such the first isolated device 202A may compute a first partial data value based on a first partial exclusively available to the first isolated device 202A and the second isolated device 202B may compute a second partial data value based on a second partial exclusively available to the second isolated device 202B.

Moreover, the first and second partial data values exchanged between the first isolated device 202A and the second isolated device 202B may be derived from each other recursively such that preceding or succeeding partial data values may be derived from a succeeding or preceding data value respectively. For example, the first isolated device 202A may compute each first partial data value based on a preceding first partial data value such that, given a certain first partial data value, all first partial values succeeding the certain first partial data value are deterministically inferable from the certain first partial data value. In another example, the second isolated device 202B may compute each second partial data value based on a succeeding second partial data value such that, given a certain second partial data value, all second partial values preceding the certain second partial data value are deterministically inferable from the certain second partial data value This may be presented via a numerical example. Assuming there are N+1 limited value accounts 304. The first isolated device 202A and the second isolated device 202B may use one or more value derivation functions, for example, H and H' hash functions.

The first isolated device 202A may compute a plurality of first partial values $C_i$ (i∈0, . . . , N) for each respective accounts 304 $i$ of the N+1 accounts 304 according to equation 5 below where $Seed_A$ is the partial seed of the first isolated device 202A. As evident from equation 5, each first partial value (i+1) is derived from a preceding first partial value (i).

$$C[0,N] \to [0,1]^{256}$$

$$C_0 = H'(Seed_A)$$

$$C_{i+1} = H(C_i) \qquad \text{Equation 5:}$$

The second isolated device 202B may compute a plurality of second partial values $V_i$ (i∈0, . . . , N) for each respective accounts 304 $i$ according to equation 6 below where $Seed_B$ is the partial seed of the second isolated device 202B. As evident from equation 6, each first partial value (i) is derived from a succeeding second partial value (i+1).

$$V[0,N] \to [0,1]^{256}$$

$$V_N = H'(\text{Seed}_B)$$

$$V_i = H(V_{i+1})$$ Equation 6:

The private key of an account 304 *i*, in particular the seed $S_i$ from which the asymmetric cryptographic key pair (comprising the private key) of the account 304 *i* is derived may be computed using one or more functions, for example, a XOR functions according to equation 7 below.

$$S_i = V_i \text{ XOR } C_{N-i}$$ Equation 7:

In the initial state, the first isolated device 202A stores the first partial value $C_0$ and the second isolated device 202B stores the second partial value $V_0$. The second isolated device 202B may transfer (the user 208 makes the transfer as intermediator) the second partial value $V_0$ to the first isolated device 202A.

The first isolated device 202A may transfer to the second isolated device 202B a certain digital assets value stored in one or more used accounts 304 by transferring (via the user 208) control over the used account(s) 304 to the second isolated device 202B. To this end, the first isolated device 202A may transfer to the second isolated device 202B the first partial value $C_i$ of the used account 304 having the lowest index among the used accounts 304.

The second isolated device 202B may transfer to the first isolated device 202A a certain digital assets value stored in one or more used accounts 304 by transferring (via the user 208) control over the used account(s) 304 to the first isolated device 202A. To this end, the second isolated device 202B may transfer to the first isolated device 202A the second partial value $V_i$ of the used account 304 having the highest index among the used accounts 304.

For example, assuming, in the initial state, that the first isolated device 202A transfers to the second isolated device 202B control over five accounts 304. The first isolated device 202A may transfer the first partial value $C_{N-4}$ to the second isolated device 202B. The second isolated device 202B may thus (recursively) infer the first partial values $C_{N-0}$, $C_{N-1}$, $C_{N-2}$, $C_{N-3}$, $C_{N-4}$ and may therefore compute the account seeds $S_0$, $S_1$, $S_2$, $S_3$, $S_4$ thus gaining control over the digital assets stored in accounts 0 through 4. In practice, the first isolated device 202A may transfer the first partial value $C_{N-4}$ to the second isolated device 202B only when digital assets is to be transferred out of used accounts that are under control of the second isolated device 202B. Until that time there is no actual need to transfer this information to the second isolated device 202B.

In addition, the first isolated device 202A discards (erases from memory) the second partial value $V_0$ after inferring $V_5$ from $V_0$ and its 5 succeeding hash values. The first isolated device 202A may thus (recursively) infer the second partial values $V_5$ to $V_N$ and may therefore compute the account seeds $S_5$ to $S_N$ thus gaining control over the digital assets stored in accounts all the accounts except the first five accounts.

Assuming the first isolated device 202A transfers to the second isolated device 202B control over three additional accounts 304, the first isolated device 202A may transfer the first partial value $V_5$ to the second isolated device 202B and discard (erase from memory) the second partial value $V_5$ after inferring $V_8$ from $V_5$ and its 3 succeeding hash values. The second isolated device 202B may thus (recursively) infer the first partial values $C_{N-0}$, $C_{N-1}$, $C_{N-2}$, $C_{N-3}$, $C_{N-4}$, $C_{N-5}$, $C_{N-6}$, $C_{N-7}$ and may therefore compute the account seeds $S_0$, $S_1$, $S_2$, $S_3$, $S_4$, $S_5$, $S_6$, $S_7$ thus gaining control over the digital assets stored in accounts 0 through 7.

In addition, the first isolated device 202A discards (erases from memory) the second partial value $V_5$ after inferring $V_8$ from $V_5$ and its 3 succeeding hash values. The first isolated device 202A may thus infer the second partial values $V_8$ to $V_N$ and may therefore compute the account seeds $S_8$ to $S_N$ thus gaining control over the digital assets stored in accounts all the accounts except the first eight accounts.

Assuming the second isolated device 202B now transfers to the first isolated device 202A control over four accounts 304. The second isolated device 202B may transfer the second partial value $V_4$ to the first isolated device 202A. The first isolated device 202A may thus infer the second partial values $V_4$ to $V_N$ and may therefore compute the account seeds $S_4$ to $S_N$ thus gaining control over the digital assets stored in accounts all the accounts except the first four accounts In addition, the second isolated device 202B discards (erases from memory) the first partial value $C_{N-7}$ after (recursively) inferring $C_{N-3}$ from $C_{N-7}$ and its 4 preceding hash values. The second isolated device 202B having the first partial value $C_3$ may still compute the account seeds $S_0$ to $S_3$ thus maintaining control over the digital assets stored in accounts 0 through 3.

As stated herein before, the transfer session conducted by the user 208 between the first isolated device 202A and the second isolated device 202B is reliable and trusted. However, a malicious party may monitor the session and/or intercept messages transferred between the isolated devices to acquire one or more pairs of the first and second partial values. Using these intercepted first and second partial, the malicious party may gain control over one or more of the limited value accounts 304 and may gain access and control over the digital assets stored in these accounts 304.

A possible solution is encrypting the messages transferred between the first isolated device 202A and the second isolated device 202B to prevent such eavesdropping and message interception by the malicious party(s). However, the malicious party may compromise (steal, hack, etc.) one of the isolated devices 202A and/or 202B and probe the memory of the compromised isolated devices 202 to retrieve past encrypted messages. The malicious party may then decrypt the messages and acquire one or more pairs of the first and second partial values.

In order to overcome such security vulnerabilities and ensure the reliability of the transfer session, the first isolated device 202A and the second isolated device 202B may employ one or more advanced secure protocols which may ensure message security even if transferred messages are intercepted by the malicious party. For example, the first isolated device 202A and the second isolated device 202B may employ the Diffie-Hellman key exchange (DH) protocol for securely exchanging cryptographic keys over a public channel.

Using the Diffie-Hellman key exchange (DH) protocol, the first isolated device 202A and the second isolated device 202B may share a common secret, for example, a seed value. The first isolated device 202A and the second isolated device 202B may then each create an encryption key derived from the shared secret and erase the common secret from their memories. This may be done once, for example, during the first-ever initialization process of the first isolated device 202A and the second isolated device 202B.

The first isolated device 202A and the second isolated device 202B may use their encryption keys to encrypt messages they transfer with each other.

During one or more predefined synchronization events, each of the first isolated device 202A and the second isolated device 202B may create a new encryption key derived from a previous encryption key created during the previous synchronization event. The new encryption key is created deterministically from the previous encryption key using one or more one-way functions, for example, a hash function such that the previous encryption key may not be inferred from new encryption key. The first isolated device 202A and the second isolated device 202B then erase the previous encryption key from their memory. The process naturally starts with the first encryption key derived from the shared secret such that during the first synchronization event following the first-ever-initialization process, the new encryption key is derived from the encryption key derived from the shared secret.

Since the messages are encrypted with a constantly replaced encryption key, even if one or both of the first isolated device 202A and the second isolated device 202B are compromised, past messages extracted from their memory may not be decrypted since the respective encryption key may have already been replaced with a new one.

The synchronization events may take place at predefined times. For example, a synchronization event may be scheduled every predefined time period, for example, once a month. In another example, the synchronization event may be defined per transferred message such that each message is encrypted with a new encryption key. In another example, the synchronization event may be defined to take place every predefined number of transferred messages, for example, ten messages. Of course the synchronization events may be defined as any combination of the above exemplary times and/or operations.

It is expected that during the life of a patent maturing from this application many relevant systems, methods and computer programs will be developed and the scope of the terms secure channel and blockchain is intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting. In addition, any priority document(s) of this application is/are hereby incorporated herein by reference in its/their entirety.

What is claimed is:

1. A method of increasing security of digital assets stored in an isolated device, comprising:

using at least one processor of an isolated device associated with a user, wherein said isolated device receives inputs only through a limited capacity input interface operated by the user, wherein the inputs include at least one limited length string entered by the user, wherein said isolated device is connected to an access device only by a single unidirectional secure channel capable of transmit-only communication from said isolated device to said access device, wherein said access device is connected to a network deployed by a plurality of computing nodes regulating digital assets and wherein data received by said access device from said network cannot be transferred from said access device to said isolated device through said unidirectional secure channel, the at least one processor is used for:

creating a plurality of accounts associated with the isolated device, each of the plurality of accounts is configured to store a predefined limited value of digital assets, wherein a number of the created plurality of accounts is determined according to an overall value of the digital assets stored on the isolated device and the predefined limited value of digital assets stored in each of said plurality of accounts;

computing a plurality of asymmetric cryptographic key pairs each assigned to a respective one of the plurality of accounts, each of the plurality of asymmetric cryptographic key pairs comprising a private key encrypting the respective account and a corresponding public key identifying the respective account;

transmitting, via the unidirectional secure channel, the public key assigned to each of the plurality of accounts to at least one computing node of the plurality of computing nodes connected to the network;

validating, before transferring the value of digital assets, an overall value of the digital assets stored in the plurality of accounts reported by the at least one computing node according to a consensus among at least some of the plurality of computing nodes; and in response to a request received through said limited capacity input interface operated by said user, to transfer a value of the digital assets, transmitting to the at least one computing node, via the unidirectional secure channel, the private key of at least one of the plurality of accounts which stores a limited value of the digital assets, that is equal to the value of the digital assets requested to be transferred;

wherein the at least one computing node is configured to use the private key to release the limited value stored in the at least one account and further configured to conduct at least one transaction which transfers the requested value from the at least one account;

wherein said isolated device is not connected to said network except for communication through said access device; and wherein said limited capacity input interface is configured to receive limited and very low volume of data in textual strings.

2. The method of claim 1, wherein the digital assets comprising a cryptocurrency and the isolated device is a cryptocurrency wallet.

3. The method of claim 1, wherein the digital assets comprising instructions for digital transactions of a fiat money.

4. The method of claim 1, wherein the limited value of digital assets is pre-defined.

5. The method of claim 1, wherein at any given time each of the plurality of accounts is in one of two states, in a ready-for-use state of the two states a respective account stores zero value of the digital assets and is hence available for storing at least part of a received value, in a used state of the two states the respective account stores the limited value of the digital assets and is hence unavailable for storing additional digital assets.

6. The method of claim 5, wherein each of the plurality of accounts is configured to support multiple uses such that a respective account supports multiple use cycles in which the respective account transitions between the two states, wherein: a respective account which is currently in the ready-for-use state switches to the used state when at least part of a received value is stored in the respective account, and a respective account which is currently in the used state switches to the ready-for-use state when the limited value stored in the respective account is transferred from the isolated device, a new asymmetric cryptographic key pair is created for the respective account based on a number of use cycles identified for the respective account.

7. The method of claim 6, further comprising receiving a value of the digital assets determined according to a received limited length string computed by the at least one computing node, the received value is stored in at least one ready-for-use account of the plurality of accounts which are incrementally indexed according to a deterministically computed order shared by the isolated device and the at least one computing node, the at least one ready-for-use account having an index subsequent to a most recently used account of the plurality of accounts is determined according to the received value and the limited value.

8. The method of claim 7, wherein the transferred value is transferred from at least one used account of the plurality of accounts which most recently switched from the ready-for-use state to the used state.

9. The method of claim 6, wherein the plurality of asymmetric cryptographic key pairs are generated deterministically using a seed uniquely assigned to the user.

10. The method of claim 9, further comprising generating the seed randomly using at least one random number generator.

11. The method of claim 9, wherein the plurality of asymmetric cryptographic key pairs assigned to the plurality of accounts are generated deterministically based on a plurality of account seeds, each of the plurality of account seeds is generated deterministically based on the seed and the index of a respective one of the plurality of accounts.

12. The method of claim 11, wherein a plurality of new asymmetric cryptographic key pairs are generated for the plurality of accounts during each initialization process conducted by the user for the isolated device, each of the plurality of new asymmetric cryptographic key pairs is generated deterministically based on an account seed from the plurality of account seeds, said account seed is of a respective account and an initialization number indicative of a number of initialization processes conducted for the isolated device.

13. The method of claim 12, wherein the initialization process is a member of a group consisting of: a first-ever initialization process of the isolated device and a recovery process of the isolated device, the recovery process is conducted to restore the isolated device following at least one failure which is a member of group consisting of: the isolated device experienced a memory erasure and the isolated device is associated with the user to replace a scrapped isolated device of the user.

14. The method of claim 12, wherein during each initialization process, the isolated device transmits, to the at least one computing node, the public key generated for at least some of the plurality of accounts during each previous initialization process for a predefined number of use cycles.

15. The method of claim 12, further comprising in case the transferred value is transferred from at least one used account in which a received value was stored prior to a most recent initialization, the isolated device transmits to the at least one computing node the private key generated for the at least one account during all previous initialization processes to release the limited value stored in the at least one account.

16. The method of claim 15, further comprising the new private key generated following each transition of each account from the used state to the ready-for-use state is generated deterministically using the account seed of the respective account, an initialization seed, and a use cycle number indicative of a number of use cycles of the respective account, the initialization seed is derived from a previous initialization seed computed for a previous initialization process, the isolated device transmits the initialization seed of each previous initialization process to enable the at least one computing node to derive the initialization seed of a most recent initialization process for inferring the new private key generated for each account for at least some of the use cycles.

17. The method of claim 16, further comprising the initialization seed computed for each initialization process is deterministically derived from the initialization seed of a succeeding initialization process which is computed in advance for each of the plurality of accounts, such that the isolated device publishes the private key of the at least one account for all previous initialization processes by transmitting the initialization seed of the most recent initialization.

18. The method of claim 12, further comprising computing a backup value encoding status information of the isolated device comprising at least one of: an overall value of the digital assets stored in the plurality of accounts and a number of initialization processes conducted for the isolated device.

19. The method of claim 18, wherein during a restoration process the at least one limited length string is received to encode the backup value, the isolated device uses the backup value to validate at least some of the status information provided to the isolated device during a recovery process.

20. The method of claim 19, further comprising computing the backup value using the seed to support detection of false status information provided to the isolated device during the recovery process, the isolated device verifies the provided status information by matching between the backup value and another value computed for the received status information using the seed.

21. The method of claim 20, wherein the backup value further includes a time of creation of the backup value, the isolated device determines validity of the received status information based on the time of creation derived from the backup value.

22. The method of claim 1, further comprising transferring the value of the digital assets by communicating with a group of computing nodes of the plurality of computing nodes of the network, the private key of the at least one account from which the transferred value is transferred is constructed as a plurality of key components each transmitted to a respective one of the computing nodes of the group, the private key required for releasing the limited value from the at least one account is constructed by aggregating the key components of a predefined subset of computing nodes of the group.

23. The method of claim 1, further comprising using another isolated device for storing, transferring and receiving the digital assets such that values of the digital assets are transferable between the isolated device and the another isolated device by publishing to each other a first partial data value and a second partial data value from which an asymmetric cryptographic key pair is derived for at least one account storing the transferred value.

24. The method of claim 23, wherein the first partial data value is computed by the isolated device using a first unique seed assigned to the isolated device and the second partial data value is computed by the another isolated device using a second unique seed assigned to the another isolated device.

25. The method of claim 23, further comprising each first partial data value is computed based on a preceding first partial data value such that given a certain first partial data value all first partial values succeeding the certain first partial data value are deterministically inferable from the certain first partial data value, each second partial data value is computed based on a succeeding second partial data value such that given a certain second partial data value all second partial data values preceding the certain second partial data value are deterministically inferable from the certain second partial data value.

26. The method of claim 25, wherein in order to transfer a value of the digital assets from the isolated device to the another isolated device, the isolated device shares with the another isolated device the first partial data value associated in the isolated device with a certain account of the plurality of accounts where the certain account and its preceding accounts cumulatively store a designated value of the digital assets defined by transferred value such that the another isolated device has access to the designated digital assets value stored in the certain account and its preceding accounts, wherein sharing data between said isolated device and said another isolated device is conducted by a user serving as an intermediator by operating said limited capacity input interface of the isolated device and a limited capacity input interface of the another isolated device.

27. The method of claim 25, wherein in order to transfer a value of the digital assets from the another isolated device to the isolated device, the another isolated device shares with the isolated device the second partial data value associated in the another isolated device with a certain account of the plurality of accounts where the certain account and its preceding accounts cumulatively store a designated value of the digital assets defined by transferred value such that the isolated device has access to the designated digital assets value stored in the certain account and its preceding accounts, wherein sharing data between said another isolated device and said isolated device is conducted by a user serving as an intermediator by operating a limited capacity input interface of the another isolated device and the limited capacity input interface of the isolated device.

28. An isolated device associated with a user for increasing security of digital assets stored in the isolated device, comprising:
  a single unidirectional secure channel, capable of transmit-only communication, and connecting said isolated device to an access device which is connected to a network deployed by a plurality of computing nodes regulating digital assets, wherein said transmit-only communication is from said isolated device to said access device, and wherein data received by said access device from said network cannot be transferred from said access device to said isolated device through said unidirectional secure channel;
  a limited capacity interface configured to receive at least one limited length string entered by a user operating said limited capacity interface;
  a memory storing instructions; and
  at least one processor coupled to the unidirectional secure channel, to the limited capacity interface, and to the memory, the at least one processor receives inputs only through said limited capacity input interface operated by said user, the at least one processor executes the instructions, causing the at least one processor to:
  create a plurality of accounts associated with the isolated device, each of the plurality of accounts is configured to store a predefined limited value of digital assets, wherein a number of the created plurality of accounts is determined according to an overall value of the digital assets stored on the isolated device and the predefined limited value of digital assets stored in each of said plurality of accounts,
  compute a plurality of asymmetric cryptographic key pairs each assigned to a respective one of the plurality of accounts, each of the plurality of asymmetric cryptographic key pairs comprising a private key encrypting the respective account and a corresponding public key identifying the respective account, transmit, in response to a request received through said limited capacity input interface operated by said user, to transfer, via the unidirectional secure channel, the public key assigned to each of the plurality of accounts to at least one computing node of the plurality of computing nodes connected to the network, validate an overall value of the digital assets stored in the plurality of accounts reported by the at least one computing node according to a consensus among at least some of the plurality of computing nodes, and transfer a value of the digital assets by transmitting, to the at least one computing node, the private key of at least one of the plurality of accounts storing a limited value of the digital assets equal to the transferred value, wherein the at least one computing node is configured to use the private key to release the limited value stored in the at least one account and further configured to conduct at least one transaction which transfers the transferred value from the at least one account; and wherein said isolated device receives inputs only through said limited capacity input interface operated by said user.

29. The method of claim 1, wherein said limited capacity input interface is selected from a group consisting of: a keyboard, a touchscreen and a computer punched card reader.

* * * * *